(12) United States Patent
Bouguet et al.

(10) Patent No.: US 7,106,898 B2
(45) Date of Patent: Sep. 12, 2006

(54) 3D SCANNING USING SHADOWS

(75) Inventors: Jean-Yves Bouguet, Milpitas, CA (US); Pietro Perona, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 798 days.

(21) Appl. No.: 09/732,506

(22) Filed: Dec. 6, 2000

(65) Prior Publication Data
US 2002/0024593 A1 Feb. 28, 2002

Related U.S. Application Data

(60) Provisional application No. 60/183,172, filed on Feb. 17, 2000, provisional application No. 60/169,103, filed on Dec. 6, 1999, provisional application No. 60/169,102, filed on Dec. 6, 1999.

(51) Int. Cl.
*G06K 9/00* (2006.01)

(52) U.S. Cl. .................... 382/154; 382/174
(58) Field of Classification Search .............. 382/1, 382/154, 174; 345/419, 423, 427, 581, 426, 345/425; 356/3.1
See application file for complete search history.

(56) References Cited

U.S. PATENT DOCUMENTS

| | | | | |
|---|---|---|---|---|
| 4,737,921 A | * | 4/1988 | Goldwasser et al. | 345/421 |
| 4,873,651 A | * | 10/1989 | Raviv | 700/259 |
| 5,513,130 A | * | 4/1996 | Redmond | 703/2 |
| 5,687,249 A | * | 11/1997 | Kato | 382/104 |
| 5,850,463 A | * | 12/1998 | Horii | 382/118 |
| 6,219,063 B1 | * | 4/2001 | Bouguet et al. | 345/426 |
| 6,349,113 B1 | * | 2/2002 | Mech et al. | 375/240.08 |
| 6,611,617 B1 | * | 8/2003 | Crampton | 382/154 |

* cited by examiner

*Primary Examiner*—Sheela Chawan
(74) *Attorney, Agent, or Firm*—Fish & Richardson P.C.

(57) ABSTRACT

A system and method of determining 3D information about a 3D scene using shadows that are cast on the 3D object.

62 Claims, 13 Drawing Sheets

300 — Calibration - find $\Pi_H$ position    1) Shadow times at each pixel

305 — Obtain image of the shadow    2) Locate projections

310 — Convert projections ($\lambda$) into actual shadow info ($\Lambda$)

315 — Find shadow plane

320 — Find $P \subset X_C$ by triangulation

*A pencil of known height h orthogonal to the plane*

*successive steps:*

Step 1: Acquire a set shadow images, extract the shadow edges and compute their intersections.

Step 2: Reject all isolated edges (and isolated groups of edges) so that the entire edge-web is fully connected (def. 2). Results a set of N edges $\mathcal{E}_f$, and $N_p$ intersection points $p_f$.

Step 3: Build the 2N x 2N matrix C (eq. 7.10, 7.11 and 7.12), and compute the unitary seed vector $\overline{U}^0$ by SVD. Euclidean reconstruction is then achieved up to the three scalars $\alpha$, $\beta$, and $\gamma$.

Step 4: Select (at least) three points in the scene with known depths, and solve linearly for the remaining scalars $\alpha$, $\beta$, and $\gamma$ (eq. 7.13).

Step 5: Compute the list of shadow plane vectors $\overline{\omega}_j$ (eq. 7.7 and 7.2) and triangulate all the points in the edge-web. The resulting set of 3D points may then be triangulated into a surface mesh for visualization purposes (fig. 7.5 and 7.6).

*FIG. 11*

3D SCANNING USING SHADOWS

CROSS REFERENCE TO RELATED APPLICATIONS

This application claims the benefit of the U.S. Provisional Applications Nos. 60/169,103, filed Dec. 6, 1999; 60/169, 102, filed Dec. 6, 1999; and 60/183,172, filed on Feb. 17, 2000.

U.S. Government may have certain rights in this invention pursuant to National Science Foundation, contract Agreement No. EEC-9402726.

BACKGROUND

Three-dimensional scanning has recently become popular. However, many of the scanners used for such scanning trade-off between cost of acquisition and/or use, accuracy, ease-of-use and/or speed of acquisitions. Many commercial 3-D scanners emphasize the accuracy over all other parameters.

Scanners such as the Cyberware scanner may use an active illumination system in a fixed installation with controlled lighting. The object is transported using a motorized transport system. This can significantly increase the cost of the system. Moreover, this can make the system difficult to use in many installations, such as outdoors, where lighting may be difficult to control.

SUMMARY

The present application teaches a system which allows scanning of 3D objects using shadow imaging.

In an embodiment, the system requires only a computer and a camera. The computer may be programmed to image shadows, and determine three dimensional information of an object from the imaged shadows.

BRIEF DESCRIPTION OF THE DRAWINGS

These and other aspects will now be described in detail with reference to the accompanying drawings, wherein:

FIG. 11 shows a flowchart of operation of multiple images being obtained;

DETAILED DESCRIPTION

The present application describes capturing three-dimensional surfaces using a simplified system. In one embodiment, the lighting can be "weakly structured", i.e, any light source can be used.

Figure 1:
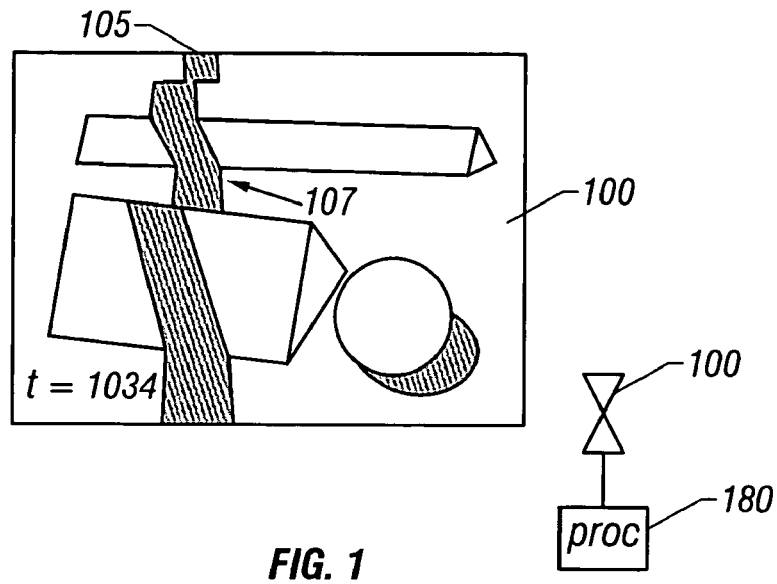
FIG. 1 shows a general set up showing three-dimensional objects and the shadow cast on those objects.

The general principle is shown in FIG. 1. The scene to be imaged 100 is shown with a shadow 105 on the scene. The shadow 105 is produced by an edge, e.g. a straight edge such as a pencil or a stick, and is caused to move across the scene 100. The human operator produces the movement.

A camera 110 monitors the image of the scene including the shadows, and produces an output which is sent to a processor 120. The processor estimates the three-dimensional shape of the scene from the sequence of images of the shadow as deformed by three-dimensional elements of the scene. The processing operates to extract scene depth at least at a plurality of pixels in the image, more preferably at every pixel in the image. It should be understood, however, that the pixels could be of any size.

Figure 2:
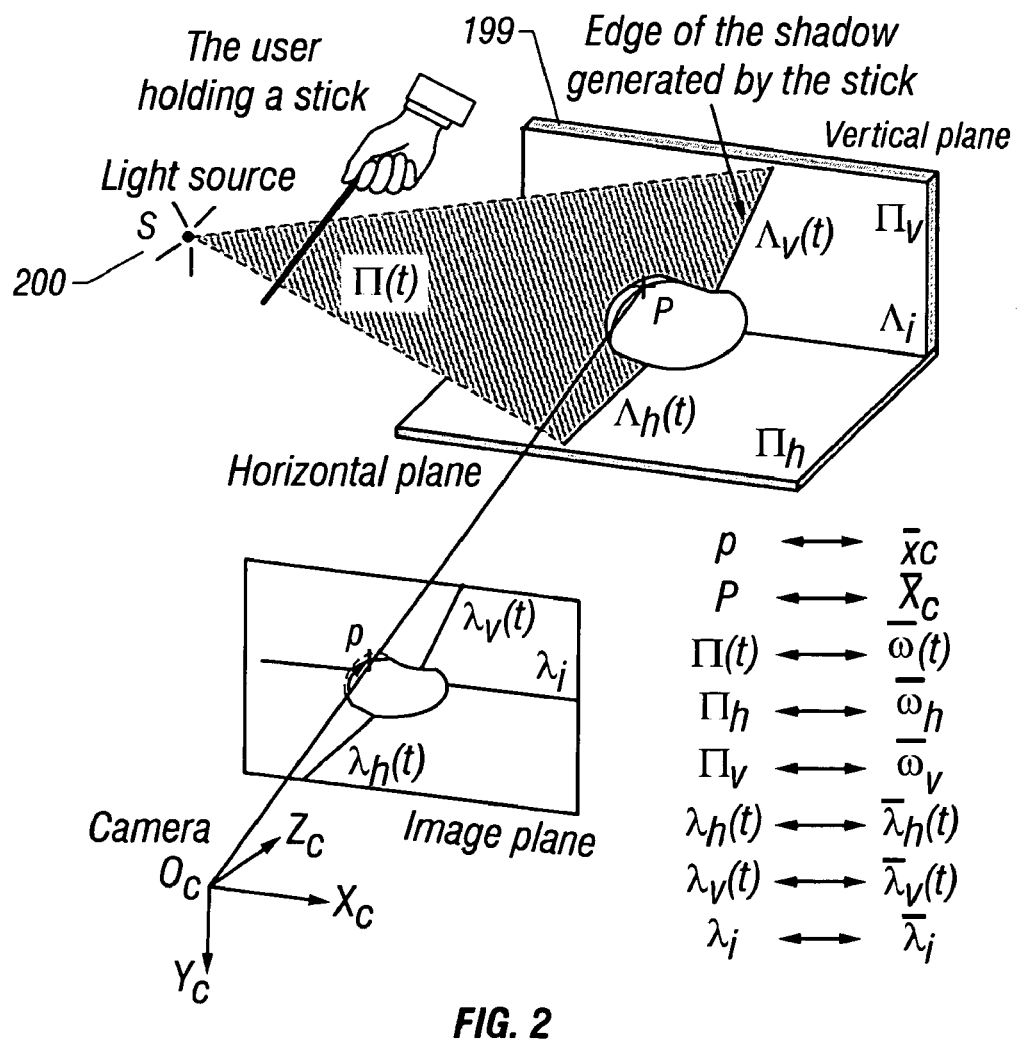
FIG. 2 shows the geometric principle of the technique used to recover three-dimensional information.

More detail about the acquisition, including the geometry of the acquisition, is shown in FIG. 2. A light source, shown approximated as point source 200, illuminates the scene 199. The intersection of the point source and the leading edge of the pencil define a plane $\Lambda(t)$, at each time instant. Therefore, the boundary of the pencil's shadow on the scene comprises the intersection between the plane $\Lambda(t)$, and the surface of the object.

In FIG. 2, the plane $\Pi_h$ represents the horizontal plane, and the plane $\Pi_v$ represents a vertical plane orthogonal to $\Pi_h$. This vertical plane is optional. In the FIG. 1 setup for example, the plane IIV is removed. The position of the plane $\Pi_h$ in the camera reference plane will be known from calibration as explained further herein. The position of $\Pi_v$ is also inferred from a projection $\Lambda_I$ at the intersection line between $\Pi_h$ and $\Pi_v$.

The end goal is to obtain three-dimensional coordinates of each point P in the three-dimensional scene. This may be done one pixel at a time. The three-dimensional location of the point P in space will be estimated corresponding to every pixel p at coordinates $x_c$ in the image obtained by the camera. Effectively, the user projects a succession of N shadows on the scene, thereby generating N shadow edges $\xi_I$, where I=1 . . . N. The points on this edge are estimated through triangulation, as described herein.

The shadow time t is defined as the time when the shadow boundary passes by a given pixel along a line $x_c$. $\Pi_t$ represents the corresponding shadow plane at that time t. The leading edge of the shadow is represented by the value $\Lambda$.

The projection of $\Lambda$ on the image plane $\lambda$ is obtained by the camera at 305. This is done by a temporal processing operation of estimating the shadow time $t_s(x_c)$ at each pixel $x_c$. This temporal processing is followed by a spatial processing, in which the projection of $\Lambda$ that is seen by the camera is represented by values $\lambda$. Therefore, the two portions of the shadow projected on the two planes $\Pi_h$ and $\Pi_v$ are visible on the image as the lines $\lambda_h$ and $\lambda_v$. After extracting these two lines, the location in space of the two corresponding lines $\Lambda_h$ and $\Lambda_v$ are obtained at 310. This can be done by forming a plane between the camera and the $\lambda$ lines. In FIG. 2, the camera origin is shown as $0_c$. A plane between $0_c$ and the $\lambda$ is can be obtained. These planes ($0_c$, $\lambda(t)$, and ($O_c$, $\lambda(t)$) are intersected with the image planes $\Pi_h$ and $\Pi_v$ respectively. The shadow plane $\Pi_t$ is then found at 315. If the vertical plane has been used for scanning, then the shadow plane is the plane defined by the two non collinear lines $\Lambda_h$ and $\Lambda_v$ at 315. If the vertical plane has not been used for scanning, however, the shadow plane may still be inferred from the only available line $\lambda_H$ and the position of the point light source S. in this latter case, point light source needs to be at a known and fixed location in space.

At 320, the actual point P corresponding to the pixel $x_c$ is retrieved by triangulating $\Pi$ of T with the optical ray $O_c$ from the camera.

If the light source S is at a known location in space, then the shadow plane $\Pi(t)$ may be directly inferred from the point S and the line $\Lambda_h$. Consequently, no calculation of the additional plane $\Pi(t)$ is not required. Therefore, two different embodiments are contemplated: a first having two calibrated planes ($\Pi_h$ and $\Pi_v$) and an uncalibrated light source, and the second having one calibrated plane and a calibrated light source.

Camera Calibration

Figures 3, 4A:
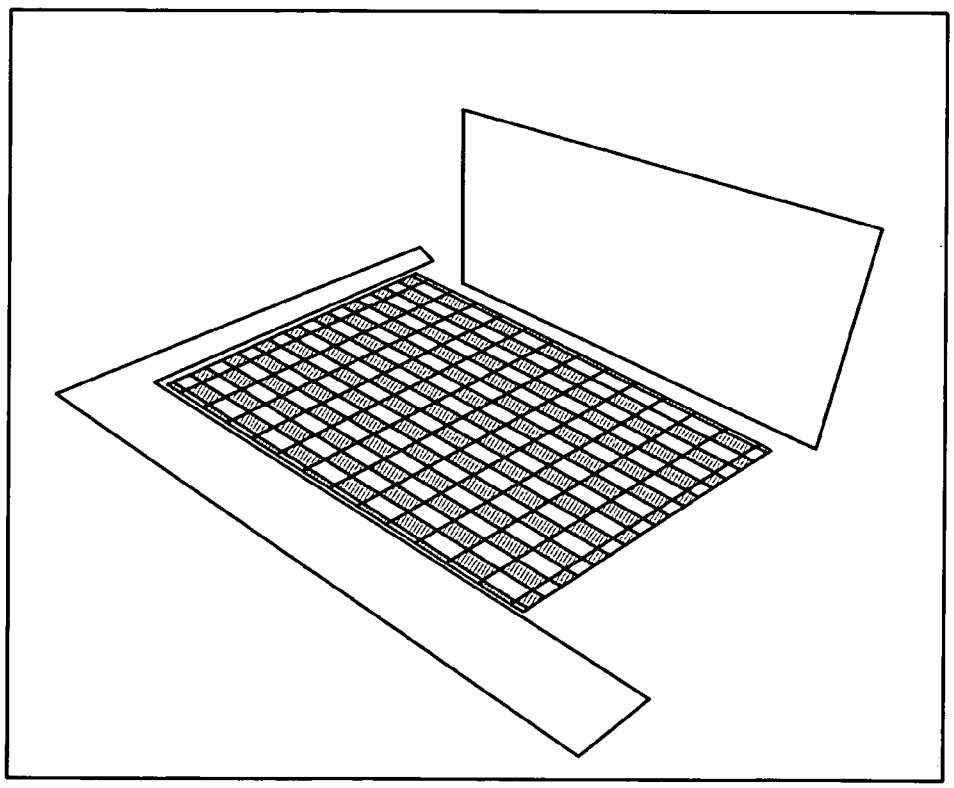
FIG. 3 shows a flowchart of operation, showing the operations that the computer carries out to recover this three-dimensional information.
FIGS. 4A and 4B show camera calibration.
Figure 4B:
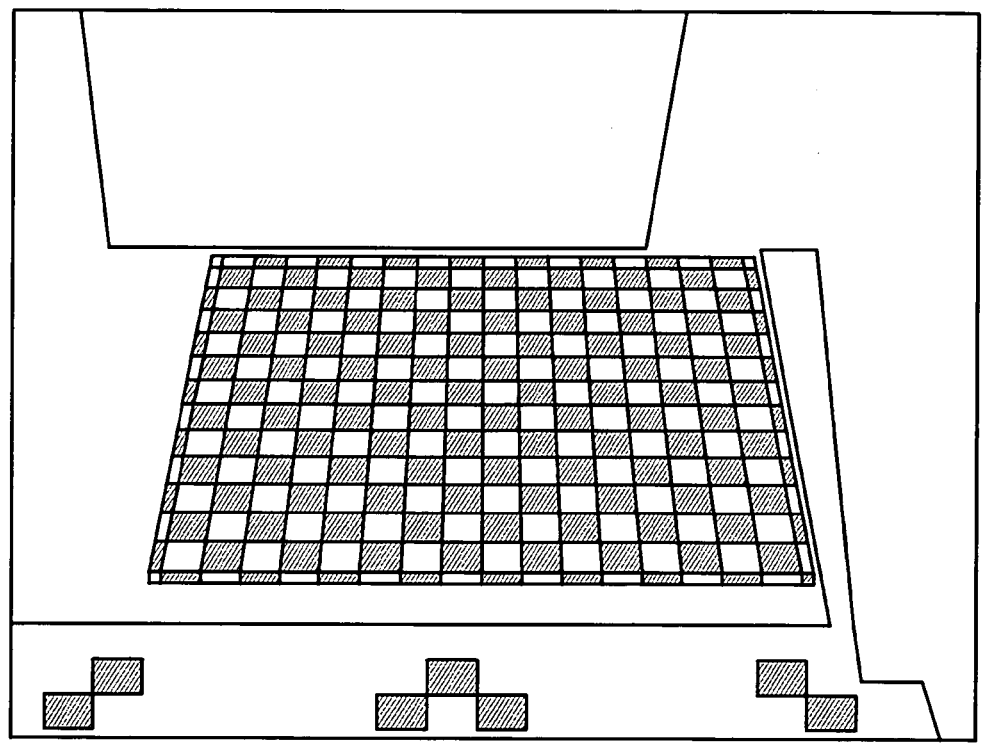

Camera calibration can be used to recover the location of the ground plane $\Pi_h$ and the intrinsic camera parameters. The intrinsic camera parameters may include focal length, principal point, and radial distortion factor. A first embodiment of the calibration technique herein uses a planar checkerboard pattern. FIGS. 4A and 4B show the setup which includes a planar checkerboard pattern 400 placed on the imaging area, e.g., the ground or table surface, in a general location of the objects to be scanned. The camera 402 is pointed at this general area. The camera 402 captures an image shown in FIG. 4B. This image is used to infer the intrinsic and extrinsic parameters of the camera.

The projections on the image planes of the known grid corners are matched to the expected projection that is directly on the image. This is described in more detail in Tsai "A Versatile Camera Calibration Technique for High Accuracy 3-D Machine Vision Metrology using off-the-shelf TV cameras and Lenses". A first order symmetric radial distortion model is used for the lens. When this technique is used with a single image, the principal point, that is the intersection of the optical axis with the image plane, cannot be easily recovered. This principal point is therefore assumed to be identical with the image center. A full camera model may be used which integrates multiple images of the planar grid at different locations in space with different orientations, e.g., using three or four images.

It has been found that the quality of reconstruction is relatively insensitive to errors in the principal point position. Therefore, either of the calibration techniques can be used.

Figure 6A:
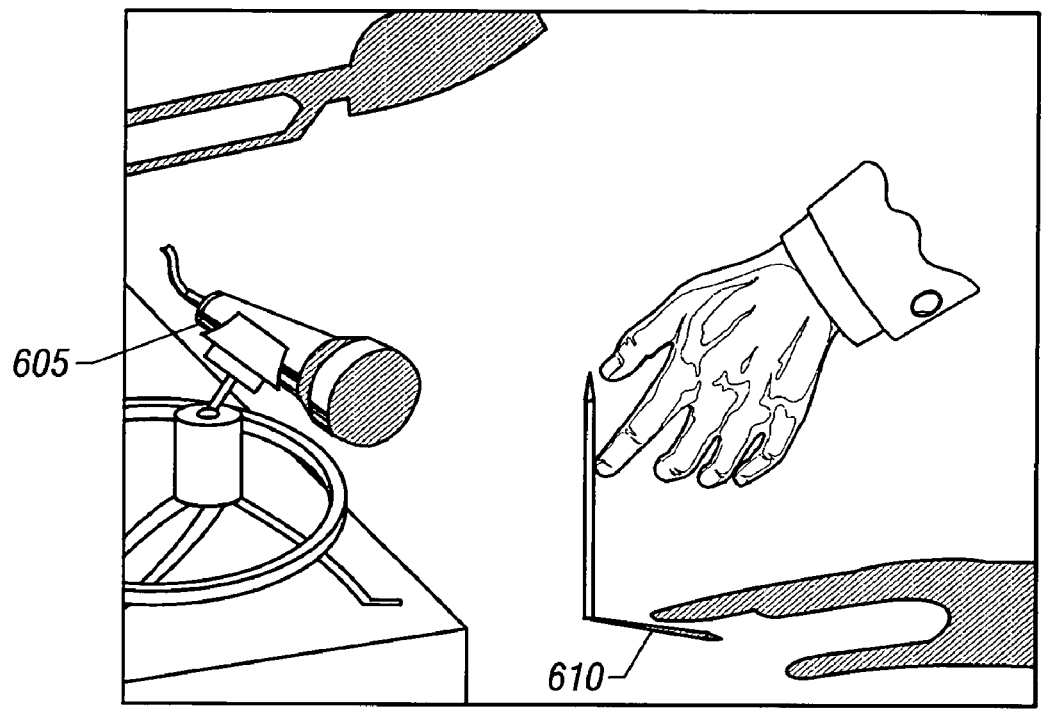
FIGS. 6A, 6B and 6C show using a pencil of known height to calibrate a position of the light source.
Figure 6B:
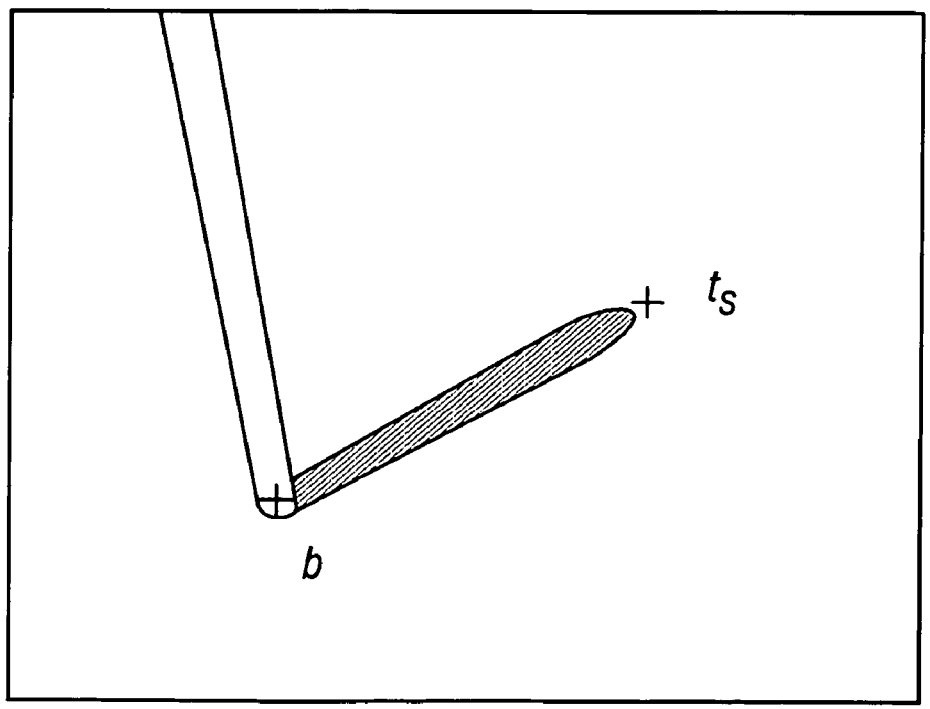
Figure 6C:
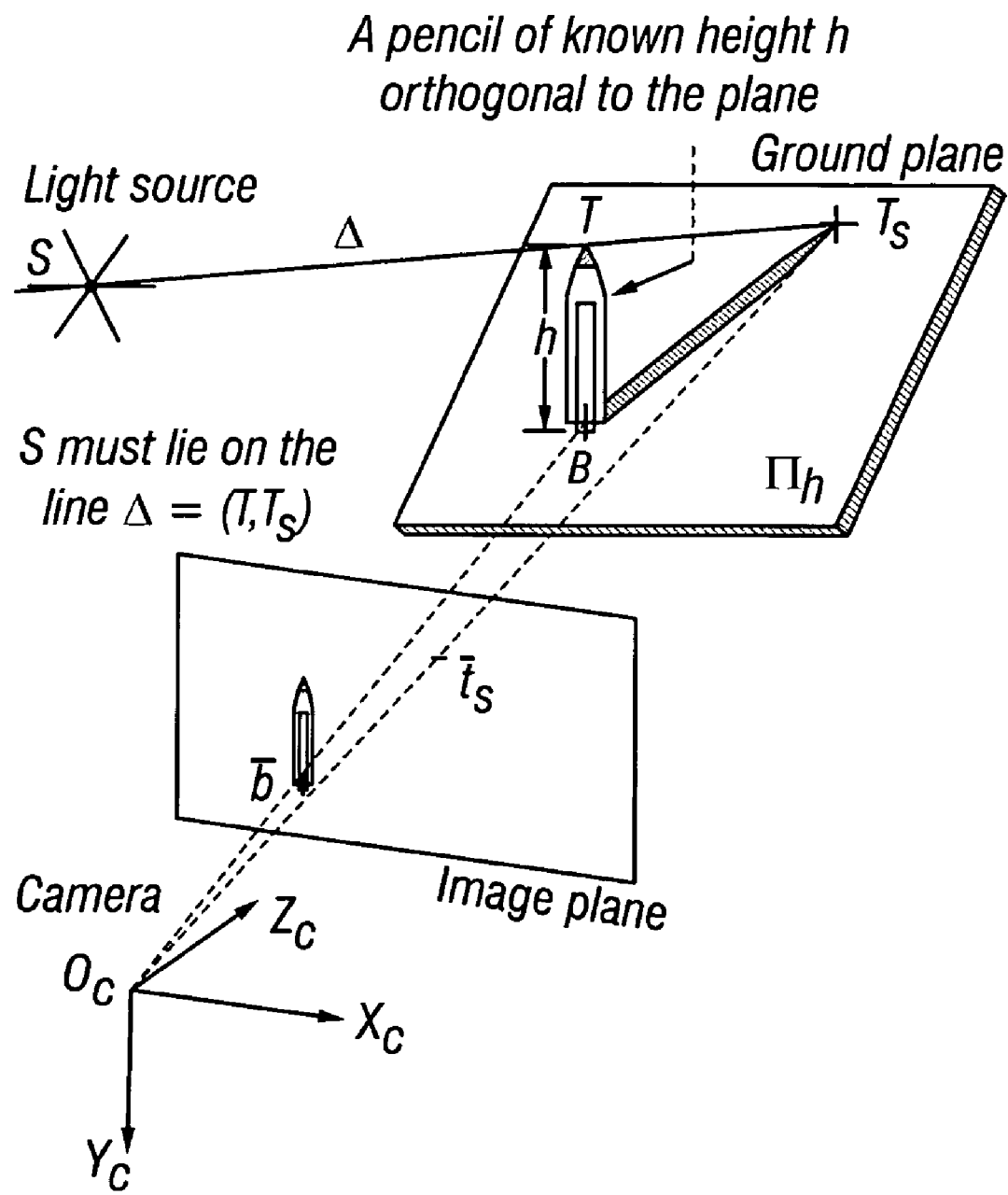

As described above, when a single reference plane, e.g. $\Pi_h$, is used for scanning, the location of the light source must be known in order to infer the shadow plane location $\Pi_t$. Another embodiment allows calibration in the light source using an item, e.g. a pencil or a stake of known length. The operation and geometric theory is shown in FIGS. 6A–6C. In FIG. 6A, the pencil is shown standing on the reference plane $\Pi_h$. The camera 605 observes the shadow of the pencil 610 as projected on the ground plane. The acquired image is shown in FIG. 6B. Two points: b and $t_s$ are found in this acquired image, as shown in FIG. 6B.

FIG. 6C shows a geometrical diagram. The points b and $t_s$ can be triangulated to obtain the position in space of pencil points B and T using the known height of the pencil H. Effectively, the coordinates of the pencil tip T can be directly inferred from B. As shown, this is done by intersecting optical rays ($0c$, b) and ($0c$, $t_s$) with the $\Pi_h$ that is known from camera calibration. The point light source S therefore must lie in the plane $\Delta = (T, T_s)$ in space. This by itself yields a first linear constraint on the position of the light source.

By taking a second view, with the pencil at different locations on the plane, a second independent constraint with another line $\Lambda$ prime can be obtained. A closed form solution for the 3-D coordinates of S may then be derived by intersecting the two lines $\Lambda$ and $\Lambda$ prime using a least squared combination.

Two views may provide sufficient information. However since the problem is linear, the estimation can be made more accurate by obtaining more than two views.

Operation 305 in FIG. 3 requires determining lines of intersection between the shadow plane $\Pi$ of T. and the two planes $\Pi$ of h and $\Pi$ of v. This may be done by the spatial processing of localizing edges of the shadow that are directly projected onto orthogonal planes at each discrete time t to form the set of all shadow planes $\Pi$ of T. Temporal processing also, and also estimating the time $t_s$ as the shadow time, where the edge of the shadow passes through any given pixel $x_c = x_c$, $y_c$ in the image.

These processing tasks allow finding the edge of the shadow. However, the search domains for the spatial and temporal processing tasks may be different. The spatial task operates on the spatial coordinates or image coordinate system, while the temporal task operates on the temporal coordinates system. One aspect of the present system enables making the two search procedures more compatible so that at any time to when the shadow passes through a pixel $x_c$, the two searches still find the exact same point (x, y, t0) in space-time.

A technique is described herein called spatio-temporal thresholding. This thresholding is based on the observation that, as the shadow is scanned across the scene, each pixel x,y sees its brightness intensity going from an initial maximum value Imax down to a minimum value $I_{min}$. The pixel then returns to its initial value as the shadow goes away. This profile is characteristic even when there is a non-neglible amount of internal reflections in the scene.

For any given pixel $\bar{x}_c = (x,y)$, define $I_{min}(x,y)$ and $I_{max}(x, y)$ as its minimum and maximum brightness throughout the entire sequence:

$$\begin{cases} I_{\min}(x, y) \doteq \min_t \{I(x, y, t)\} \\ I_{\max}(x, y) \doteq \max_t \{I(x, y, t)\} \end{cases}$$

The shadow is defined as to be the locations (in space-time) where the image I(x,y,t) intersects with the threshold image $I_{shadow}(x,y)$; defined as the mean value between $I_{max}(x,y)$ and $I_{min}(x,y)$:

$$I_{shadow}(x, y) \doteq \frac{1}{2}(I_{\max}(x, y) + I_{\min}(x, y))$$

This may be also regarded as the zero crossings of the difference image $\Delta I(x,y,t)$ defined as follows:

$$\Delta I(x,y,t) \doteq I(x,y,t) - I_{shadow}(x,y)$$

The concept of dual space may assist in certain calculations.

Shadow Plane Estimation $\Pi(t)$

Denote by $\overline{\omega}(t)$, $\overline{\lambda}_v(t)$ and $\overline{\lambda}_v(t)$ the coordinate vectors of the shadow plane $\Pi(t)$ and of the shadow edges $\lambda_h(t)$ and $\lambda_v(t)$ at time t. Since $\lambda_h(t)$ is the projection of the line of intersection $\Lambda_h(t)$ between $\Pi(t)$ and $\Pi_h$, then (t) lies on the line passing through $\overline{\omega}_h$ with direction $\overline{\lambda}_h(t)$ in dual-space (from proposition 1 of section 2.2.2). That line, denoted $\Lambda_h(t)$, is the dual image of $\Lambda_h(t)$ in dual-space as described above (see section 2.2.2). Similarly, $\overline{\omega}(t)$ lies on the line $\Lambda_v(t)$ passing through $\overline{\omega}_v$ with direction $\overline{\lambda}_v(t)$ (dual image of $\Lambda_v(t)$). Therefore, in dual-space, the coordinate vector of the shadow plane $\overline{\omega}(t)$ is at the intersection between the two known lines $\Lambda_h(t)$ and $\Lambda_v(t)$. In the presence of noise, these two lines might not exactly intersect (equivalently, the 3 lines $\lambda_i$, $\lambda_h(t)$ and $\lambda_v(t)$ do not necessarily intersect at one point on the image plane, or their coordinate vectors $\overline{\lambda}_i$, $\overline{\lambda}_h(t)$ and $\overline{\lambda}_v(t)$ are not coplanar). However, one may still identify $\overline{\omega}(t)$ with the point that is closest to the lines in the least-squares sense. The complete derivations for intersecting a set of lines in space may be found in section 4.1.2. When interesting the two lines $\Lambda_h(t)$ and $\Lambda_v(t)$ in space, the solution reduces to:

$$\overline{\omega}(t) = \frac{1}{2}(\overline{\omega_1}(t) + \overline{\omega_2}(t)),$$

with $$\overline{\omega}_1(t) \doteq \overline{\omega}_h + \alpha_h \overline{\lambda}_h(t)$$

$$\overline{\omega}_2(t) \doteq \overline{\omega}_v + \alpha_v \overline{\lambda}_v(t)$$

where $$\begin{bmatrix} \alpha_h \\ \alpha_v \end{bmatrix} = A^{-1} b$$

where A is a 2×2 matrix and b is a 2-vector defined as follows (for clarity, the variable t is omitted):

$$A \doteq \begin{bmatrix} <\overline{\lambda}_h, \overline{\lambda}_h> & -<\overline{\lambda}_h, \overline{\lambda}_v> \\ -<\overline{\lambda}_h, \overline{\lambda}_v> & <\overline{\lambda}_v, \overline{\lambda}_v> \end{bmatrix},$$

$$b \doteq \begin{bmatrix} <\overline{\lambda}_h, \overline{\omega}_v - \overline{\omega}_h> \\ <\overline{\lambda}_v, \overline{\omega}_h - \overline{\omega}_v> \end{bmatrix}$$

Note that the two vectors $\overline{\omega}_1(t)$ and $\overline{\omega}_2(2)$ are the orthogonal projections, in dual-space, of $\overline{\omega}(t)$ onto $\Lambda_h(t)$ and $\Lambda_v(t)$ respectively. The norm of the difference between these two vectors may be used as an estimate of the error in recovering $\Pi(t)$. If the two edges $\lambda_h(t)$ and $\lambda_v(t)$ are estimated with different reliabilities, a weighted least square method may still be used.

Using the additional vertical plane $\Pi_v$ enables extracting the shadow plane location without requiring the knowledge of the light source position. Consequently, the light source is allowed to move during the scan. This may allow use of natural light, e.g. the sun, for example.

When the light source is of fixed and known location in space, the plane $\Pi_v$ is not required. Then, one may directly infer the shadow plane position from the line $\lambda_h(t)$ and from the light source position S:

$$\overline{\omega}(t) = \overline{\omega}_h + \overline{\lambda}_h(t)$$

where $$S \in \Pi(t) \Leftrightarrow <\overline{\omega}(t), \overline{X}_s> = 1 \Leftrightarrow \alpha_h = \frac{1 - <\overline{\omega}_h, \overline{X}_s>}{<\overline{\lambda}_h(t), \overline{X}_s>} \qquad (6.10)$$

where $\overline{X}_s = [X_s \ Y_s \ Y_s]^T$ is the coordinate vector of the light source S in the camera reference frame. In dual-space geometry, this corresponds to the intersecting the line $\Lambda_h(t)$ with plane $\hat{S}$, dual image of the source point S. Notice that $<\overline{\lambda}_h(t), \overline{X}_s> = 0$ corresponds to the case where the shadow plane projection contains the camera center projection $O_c$. This is singular configuration that may make the triangulation fail ($\|\overline{\omega}(t)\| \to \infty$). This approach requires an additional step of estimating the position of S using light source calibration. This reconstruction method was used in experiments 2 and 3.

The quantity $1 - <\overline{\omega}_h, \overline{X}_s>$ reduces to $h_s/d_h$ where $h_s$ and $d_h$ are the orthogonal distances of the light source S and the camera center $O_c$ to the plane $\Pi_h$.

Since $\overline{\omega}_h$ is the coordinate vector of plane $\Pi_h$, the vector $\overline{n}_h = d_h \overline{\omega}_h$ is the normal vector of the plane $\Pi_h$ in the camera reference frame. Let P be a point in Euclidean space (E) of coordinate vector $\overline{X}$. The quantity $d_h - <\overline{n}_h, \overline{X}>$ is then the (algebraic) orthogonal distance of P to $\Pi_h$ (positive quantity if the point P is on the side of the camera, negative otherwise). In particular, if P lies on $\Pi_h$, then $<\overline{n}_h, \overline{X}> = d_h$, which is equivalent to $<\overline{\omega}_h, \overline{X}> = 1$. The orthogonal distance of the light source S to $\Pi_h$ is denoted $h_s$. Therefore $h_s = d_h - <\overline{n}_h, \overline{X}>$, or equivalently $1 - <\overline{\omega}_h, \overline{X}_s> = h_s/d_h$.

According to that claim, the constant $a_h$ of equation 6.10 may be written as:

$$\alpha_h = \frac{h_s/d_h}{<\overline{\lambda}_h(t), \overline{X}_s>} = \frac{1/d_h}{<\overline{\lambda}_h(t), \overline{X}_s/h_s>}$$

This expression highlights the fact that the algebra naturally generalizes to cases the light source is located at infinity (and calibrated). Indeed, in those cases, the ratio $\overline{X}_s/h_s$ reduces to $\overline{d}_s/\sin \phi$ where $\overline{d}_s$ is the normalized light source direction vector (in the camera reference frame) and $\phi$ the elevation angle of the light source with respect to the $\Pi_h$. In dual-space, the construction of the shadow plane vector $\overline{\omega}(t)$ remains the same: it is still at the intersection of $\Lambda_h(t)$ with $\hat{S}$. The only difference is that the dual image $\hat{S}$ is a plane crossing the origin in dual-space. The surface normal of that plane is simply the vector $\overline{d}_s$.

Triangulation

Once the shadow time $t_s(\overline{x}_c)$ is estimated at a given pixel $\overline{x}_c = [x_c \ y_c \ 1]^T$ (in homogeneous coordinates), the corresponding shadow plane $\Pi(t_s(\overline{x}_c))$ is identified (its coordinate vector $\overline{\omega}_c \doteq \overline{\omega}(t_s(\overline{x}_c))$) by triangulation at 320. The point P in space associated to $\overline{x}_c$ is then retrieved by intersecting $\Pi(t_s(\overline{x}_c))$ with the optical ray $(0_c, \overline{x}_c)$:

$$Z_c = \frac{1}{<\overline{\omega}_c, \overline{x}_c>} \Rightarrow \overline{X}_c = Z_c \overline{x}_c = \frac{\overline{x}_c}{<\overline{\omega}_c, \overline{x}_c>},$$

If $\overline{X}_c = [X_c \ Y_c \ Z_c]^T$ is defined as the coordinate vector of P in the camera reference frame.

Notice that the shadow time $t_s(\bar{x}_c)$ acts as an index to the shadow plane list $\Pi(t)$. Since $t_s(\bar{x}_c)$ is estimate at sub-frame accuracy, the plane $\Pi(t_s(\bar{x}_c))$ (actually it coordinate vector $\bar{\omega}_c$) results from linear interpolation between the two planes $\Pi(t_0-1)$ and $\Pi(t_0)$ if $t_0-1 < t_s(\bar{x}_c) < t_0$ and $t_0$ integer:

$$\bar{\omega}_c = \Delta t \bar{\omega}(t_0-1) + (1-\Delta t)\bar{\omega}(t_0),$$

where $\Delta t = t_0 - t_s(\bar{x}_c)$, $0 \leq \Delta t < 1$.

Pixels corresponding to occluded regions in the same cannot provide substantive information. Therefore, only pixels that have a contrast value larger than a predetermined threshold are used. In the experiments giving herein, where intensity values are encoded between zero and 255, this threshold may be 30. The threshold may also be proportional to the level of noise in the image.

Once the shadow time is estimated at any given pixel, the shadow plane can be triangulated from its coordinate vector. The point in space (P) associated to the given pixel is then retrieved by intersecting the shadow plane with this optical ray. This is shown in FIG. 2. More specifically, $$Z_c = \frac{1}{\langle \bar{\omega}_c, \bar{x}_c \rangle} \Rightarrow \bar{X}_c = Z_c \bar{x}_c = \frac{\bar{x}_c}{\langle \bar{\omega}_c, \bar{x}_c \rangle},$$

the shadow time therefore ask as an index to the shadow plane list. This effectively provides range data to the actual object.

The recovered range data is used to form a mesh by connecting neighborhood points in triangles. Connectivity is directly given by the image. Two vertices become neighbors if their corresponding pixels are neighbors in the image. Moreover, since each vertex corresponds to a unique pixel, the texture mapping can be relatively easily carried out.

Figure 7:
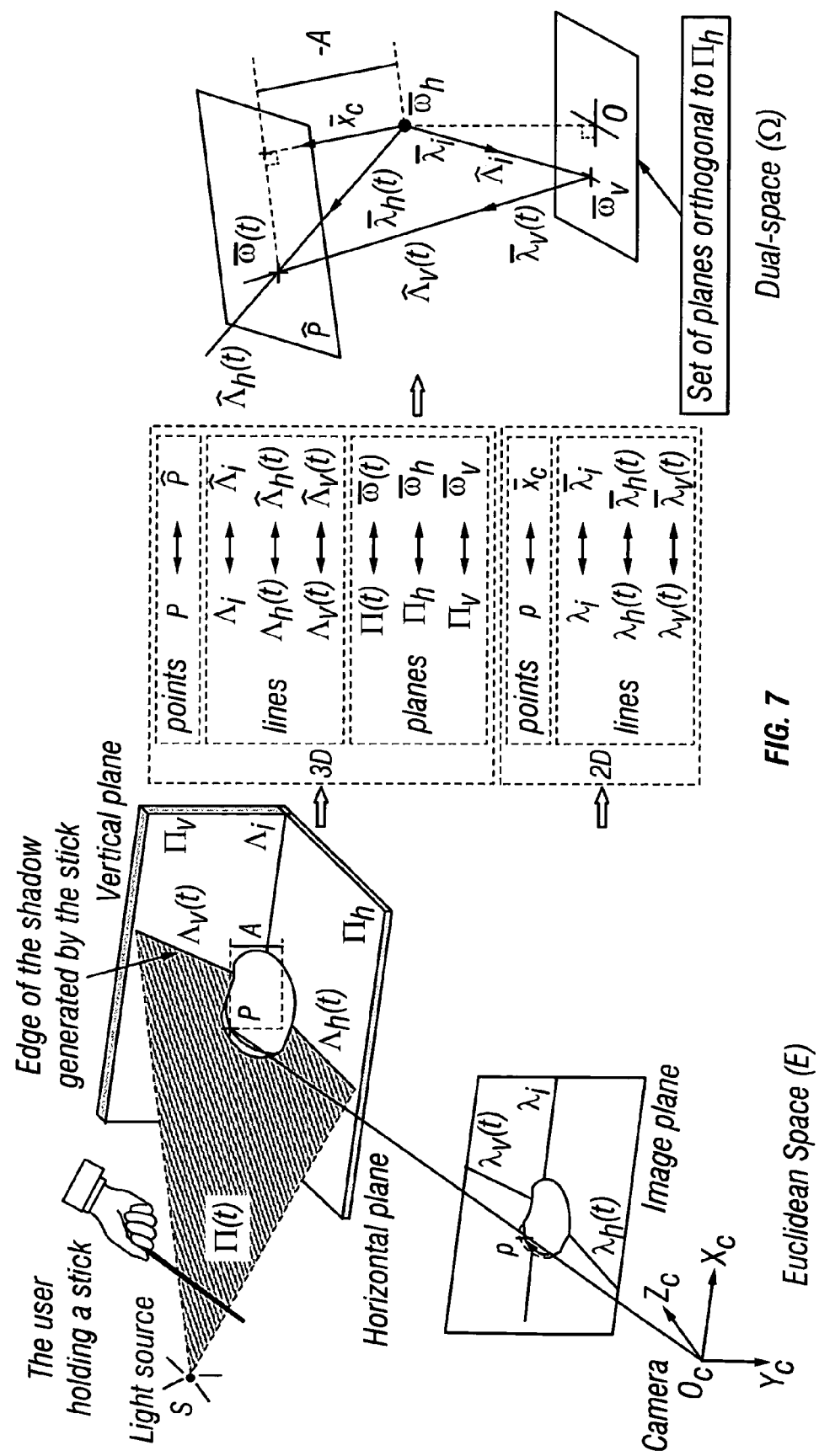
FIG. 7 shows a summary of global geometry for a system with dual background planes and uncalibrated light source.

FIG. 7 shows the global geometrical principal of the reconstruction technique in normal Euclidean space (left) and "dual space" (right). This Figure shows the correspondence between Euclidean space and dual space for objects, e.g. lines and points on the image plane, as well as objects in 3-D which include planes, lines and points in space.

Observe that the calibration of the vertical plane $\Pi_v$ is also illustrated in the dual-space diagram: its coordinate vector $\bar{\omega}_v$ is at the intersection of the $\Lambda_i$ and the set of plane vectors orthogonal to $\bar{\omega}_h$ (defining a plane in dual-space). The line $\Lambda_i$ is at the intersection of the two planes $\Pi_h$ and $\Pi_v$, and it dual image $\Lambda_i$ is uniquely defined by the horizontal plane vector $\bar{\omega}_h$ and the vector $\bar{\lambda}_i$, coordinate vector of the line $\lambda_i$ observed on the image plane. This calibration process is described above.

Once $\bar{\omega}_v$ is known, the shadow plane vector $\bar{\omega}(t)$ associated to the shadow edge configuration at time t is at the intersection between the two lines $\Lambda_h(t)$ and $\Lambda_v(t)$, dual images of $\Lambda_h(t)$ and $\Lambda_v(t)$. Those two dual lines are defined by the two reference plane vectors $\bar{\omega}_h$ and $\bar{\omega}_v$ and the direction vectors $\bar{\lambda}_h(t)$ and $\bar{\lambda}_v(t)$ (vector coordinate of the two image lines $\lambda_h(t)$ and $\lambda_v(t)$). This processing step is described in detail.

The final step consisting of identifying the point P in space by intersecting the optical ray $(0_c, p)$ with the shadow plane $\Pi$ is also illustrated on the dual-space diagram. In dual-space, that stage corresponds to finding the dual image of P that is the unique plane in dual-space containing the point $\bar{\omega}(t)$ (shadow plane vector) with orthogonal vector $\bar{x}_c$ (homogeneous coordinate vector of the image point p).

Figure 8:
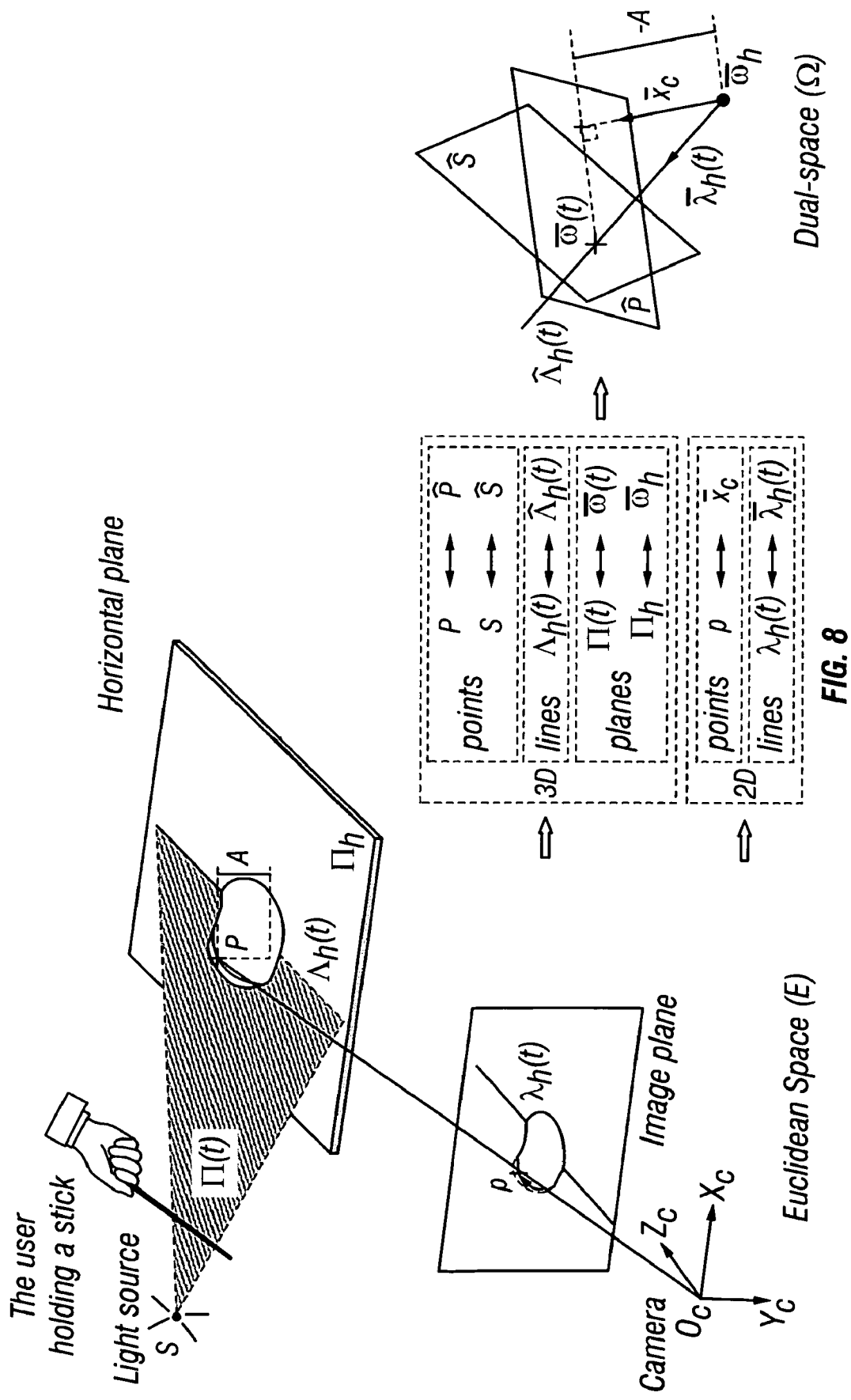
FIG. 8 shows a summary of global geometry with a single background planes and uncalibrated light source.

An alternative embodiment uses a single reference plane ($\Pi_h$ without $\Pi_v$) with a calibrated light source is summarized on FIG. 8. This technique uses a different procedure of estimating the shadow plane coordinate $\bar{\omega}(t)$. In that version, the vector $\overline{107}(t)$ is at the intersection of the dual line $\Lambda_h(t)$ and the dual image of the light source $\hat{S}$. The triangulation operation remains unchanged.

The point P in space is determined by intersecting the optical ray $O_c$, P with the shadow plane $\Pi$. This corresponds to finding the dual image of P that is the unique plane in dual space that contains the point including the shadow plane vector with the orthogonal vector. This is done by triangulation as described above.

The alternate setup uses a single reference plane with a calibrated light source as shown in FIG. 8. In the FIG. 8 setup, a different procedure is used to estimate the shadow plane coordinate vector.

The accuracy of this system is not necessarily increased by decreasing the scanning speed. However, the scanning speed must be sufficiently slow to allow each temporary pixel profile to be sufficiently sampled. A sharper shadow edge will require slower scanning so that the temporal profile at each pixel can be properly sampled. The reality, however, is that the speed of moving the shadow is really limited by the response speed of the image acquisition element.

In this system, range data can only be retrieved for pixels that correspond to regions in the scene that are illuminated by the light source and imaged by the camera. Better coverage of the scene may be obtained from multiple scans of the same scene keeping the light source at different locations each time and keeping the camera position fixed.

The previous system has described accurately characterizing 3-D surface based on projection of shadows on a known reference plane. Another embodiment describes operating without using a background plane as the reference plane, and instead using a calibrated light source.

Figure 9:
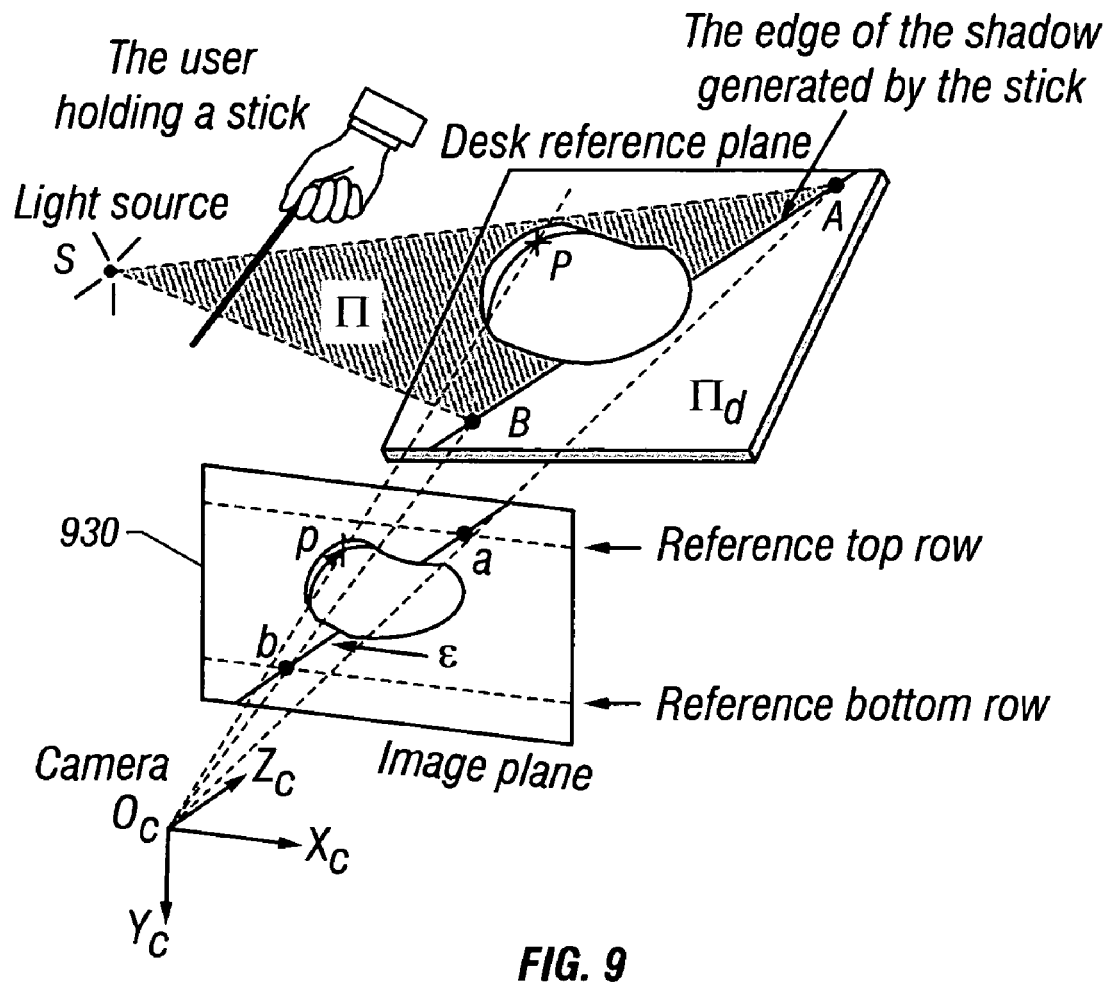
FIG. 9 shows scanning using a reference plane.

A summary of the scanning scenario for a flat reference plane is shown in FIG. 9. In the first embodiment, the plane $\Pi_d$ is used as a reference plane for scanning. The position of the light source S is known and the position of the plane $\Pi_d$ is also known from calibration/setup.

A curved edge shadow $\xi$ is projected on the image during scanning. All points in space P are estimated as the curved edge moves across the image, by estimating from the points p on $\xi$. $\Pi$ denotes the corresponding shadow plane. The image 930 corresponds to that image which is seen by the camera. The corresponding points A and B in the scene may be found by intersecting $\Pi_d$ with the optical rays $(O_c, a)$ and $(O_c, b)$ from the image. The shadow plane $\Pi$ may then be inferred from the three points in space: S, A and B.

For a given position of the shadow, once the shadow plane $\Pi$ is identified, the 3-D image of the entire shadow edge $\xi$ can be determined by geometric triangulation using, among other things, the known position of the reference plane $\Pi_d$. This embodiment describes finding the 3D image, using a similar overall technique to that described above, but without knowing $\Pi$.

The extension to this embodiment takes into account a number of issues about the image. First, depth information at two distinct points on an edge propagates along the entire edge. Also, if depths Z of two distinct points a and b of this shadow edge $\xi$ are known, then the depth at any other point in the image $Z_P$ can also be found. Depth at two distinct points propagates over the whole image.

Let $\bar{x}_A$ and $\bar{x}_B$ be the homogeneous coordinate vectors of the two points $\alpha$ and b on the image plane $\bar{x}_A = [x_A \ V_A \ 1]^T$.

Then if the two depths $Z_A$ and $Z_B$ are know, then so are the full coordinate vectors of the associated points A and B in the 3D scene: $\overline{X}_A = Z_A \overline{x}_A$ and $\overline{X}_B = Z_B \overline{x}_B$. Therefore the associated shadow plane $\Pi$ is the unique plane passing through the three points A, B and S. Once $\Pi$ is recovered, any point p along the edge $\epsilon$ may be triangulated leading to $Z_p$.

The depths of two points a and b may be known if they lie on the known reference plane $\Pi_d$. Consequently, following Property 1, depth information at a and b propagate to every point p along the edge $\epsilon$.

Depths can also propagate from edge to edge. This concept is used here to allow the depths to propagate over the entire image. According to the present embodiment, knowledge of the depth of three distinct points in the image can be used to recover the entire scene depth map. Hence, knowledge of these three distinct points can be used in place of knowledge of the reference plane $\Pi_d$.

A, b and c are defined as three distinct points in the scannable area of the image. For purposes of this explanation, it can be assumed their depths $Z_a$, $Z_B$ and $Z_c$ are known. By appropriate shadow scanning, the depth of any point p in the image can be obtained.

Figure 10:
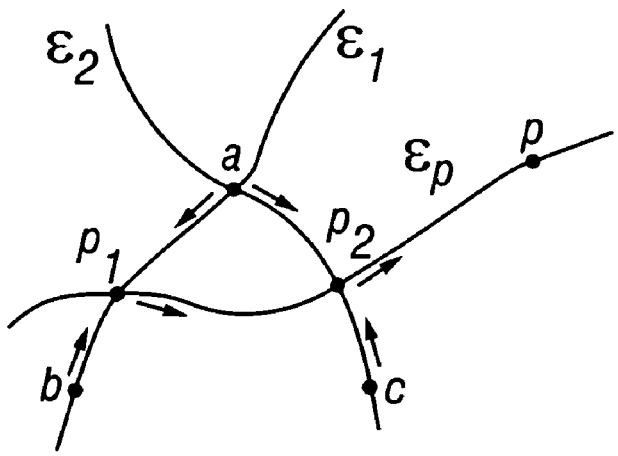
FIG. 10 shows depth propagation along multiple edges.

This can be demonstrated using a constructive example. A shadow edge $\xi 1$ that goes through points a and B can be projected. A second shadow edge $\xi 2$ can be projected through points a and c. This is shown in FIG. 10. The two points a and b on $\epsilon_1$ are of known depth, and therefore the depth of every point along that edge can be similarly computed. Analogously, for $\epsilon_2$, the depth of every point along that edge can be computed.

For every point p on the image, there can be an edge $\xi p$ that passes through p and intersects both $\epsilon_1$ and $\epsilon_2$ at distinct points $P_1$ and $P_2$ which points are each different than a. Since $P_1$ and $P_2$ each lie on the two known edges at $\epsilon_1$ and $\epsilon_2$, the depths of $\xi 1$ and $\xi 2$ must also be known. Therefore, since two points on the shadow edge $\epsilon_p$ are known, the depth of every point along $\xi_p$ may also be computed. In particular, the depth of the point p can be computed as shown in FIG. 10. Moreover, if points between the edges intersect, then the depth information can propagate from edge to edge.

As stated above, this means that knowledge of the depth at three distinct points in the image becomes sufficient to recover the entire scene depth map. To propagate depth information from {a, b, c} to p uses intersecting points p1 and p2 of the shadow edges.

The system uses edges $\xi$. An edge $\xi$ is an isolated edge if and only if it does not intersect with at least two other edges on the image. Depth information can not be propagated to any isolated edge from the rest of the edges. Isolated edges, therefore, can not be used in this system.

Figure 12:
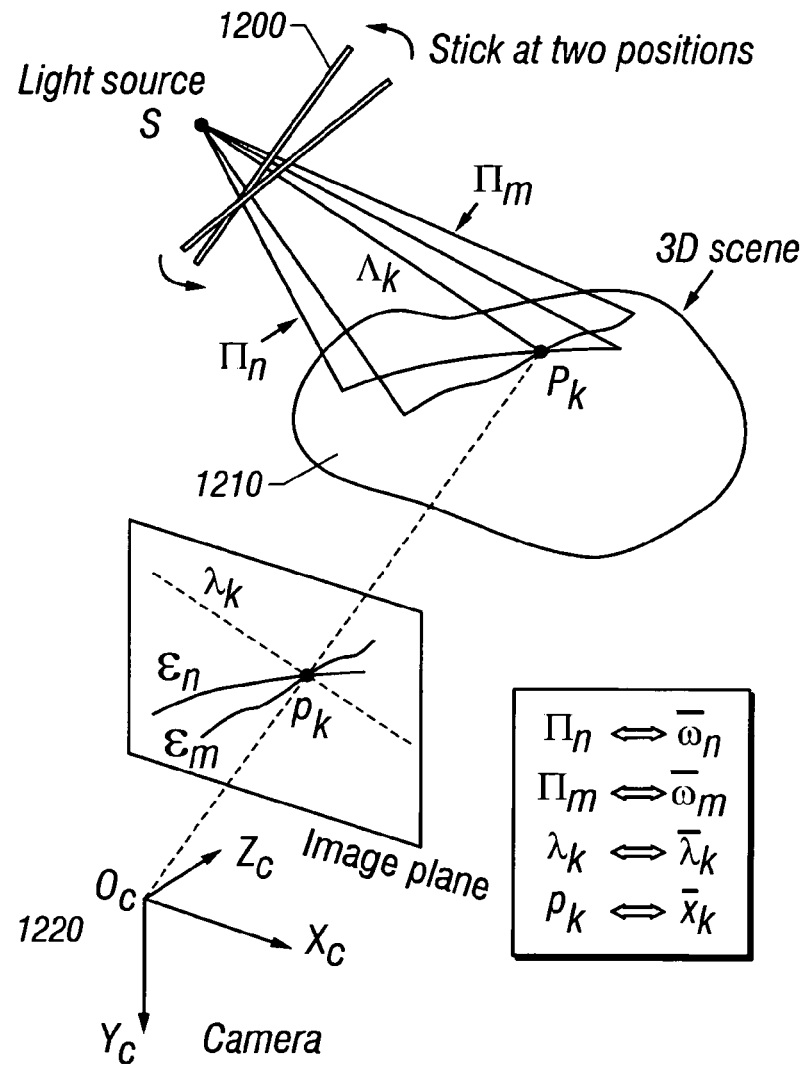
FIG. 12 shows the scanning set up with a light source and a straight edge at dual positions.

This embodiment follows the summary flowchart of FIG. 11, using the setup shown in more detail in FIG. 12. In FIG. 11, a number of summary operations are described, which are each described in further detail herein. The hardware of FIG. 12 shows a point source at S, and a straight edge producing element, e.g. a stick 1200 being shown in two different positions. Each different position projects a shadow onto the 3-D scene 12. A camera at 1220 receives a view of the image plane, and uses that view to reconstruct details of the 3-D image.

At 1110, a set of shadow images is obtained. The shadows are extracted, and their intersections are computed.

Let $\Pi_i$ be the $i^{th}$ shadow plane generated by the stick (i=1, ..., N), with corresponding plane vector $\overline{\omega}_i = [w_x^i \ w_y^i \ w_z^i]^T$ (in dual space). For all vectors $\overline{\omega}_i$ to be well defined, it is required that none of the planes $\Pi_I$ contain the camera center $\mathbf{0}_c$. Denote by $\epsilon_I$ the associated shadow edge observed on the image plane. The N vectors $\overline{\omega}_I$ constitute then the main unknowns in the reconstruction problem. Once those vectors are identified, all edges can be triangulated in space. Therefore, there is apparently a total of 3N unknown variables. However, given the scanning scenario, every shadow plane $\Pi_i$ must contain the light source point S. Therefore, $\overline{X}_s = [X_s \ Y_s \ Z_s]^T$ the light source coordinate vector in the camera reference frame (known), provides $$\forall i=1, \ldots, N, \ <\overline{\omega}_i, \overline{X}_S> = 1$$

Figure 13:
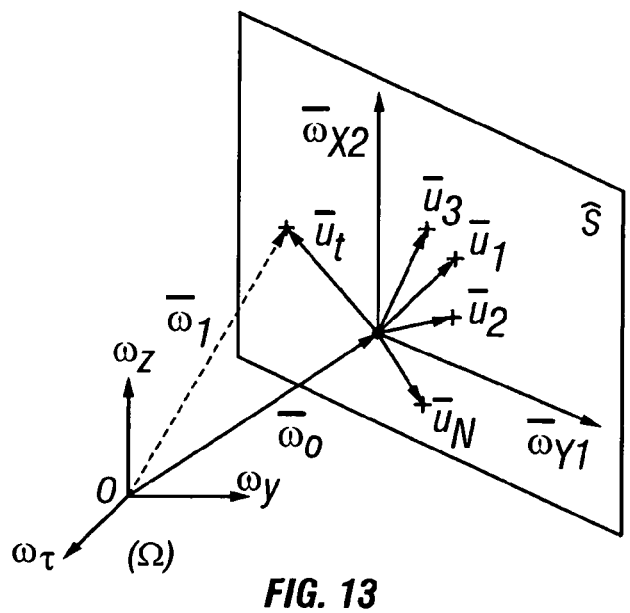
FIG. 13 shows will coordinate transformation for the system.

Equivalently, in dual-space, all shadow plane vectors $\overline{\omega}_i$ must lie on the plane $\hat{S}$, dual-image on the light source point S. One may then explicitly use that constraint, and parameterize the vectors $\overline{\omega}_i$ using a two-coordinate vector $\overline{u}_i = [u_x^i \ u_y^i]^T$ such that:

$$\overline{\omega}_i = W\overline{u}_i + \overline{\omega}_0 = [\overline{\omega}_{s1} \ \overline{\omega}_{s2}]\overline{u}_i + \overline{\omega}_0$$

where $\overline{\omega}_0$, $\overline{\omega}_{s1}$, and $\overline{\omega}_{s2}$ are three vectors defining the parameterization. For example, if $X_S \neq 0$, one may then keep the last two coordinates of $\overline{\omega}$hd i as parameterization: $\overline{u}^i = [w_y^i \ w_z^i]^T$, picking $\overline{\omega}_{s1} = [-Y_S/X_S \ 1 \ 0]^T$, $\overline{\omega}_{s2} = [-Z_S/X_S \ 0 \ 1]^T$ and $\overline{\omega}_0 = [1/X_S \ 0 \ 0]^T$. Any other choice of linear parameterization is acceptable (there will always exist one give that is $S \neq 0_c$). In order to define a valid coordinate change, the three non-zero vectors $\overline{\omega}_0$, $\overline{\omega}_{s1}$, and $\overline{\omega}_{s2}$ must only satisfy the three conditions (a) $<\overline{\omega}_0, \overline{X}_S> = 1$, (b) $<\overline{\omega}_{s1}, \overline{X}_S> = 0$, (c) $\overline{\omega}_{s1} \neq \overline{\omega}_{s2}$. In dual-space, $\{\overline{\omega}_{s1}, \overline{\omega}_{s2}\}$ (or W) may be interpreted as a basis vector of the plane $\hat{S}$ and $\overline{\omega}_0$ as one particular point on that plane. FIG. 13 shows the coordinate transformation.

After that parameter reduction, the total number of unknown variables reduces to 2N: two coordinates $u_x^i$ and $u_y^i$ per shadow plane $\Pi_i$. Given that reduced plane vector parameterization (called $\overline{u}$-parameterization), global reconstruction can be carried out.

Intersecting points between the edges themselves depth information that propagates from edge to edge. These points provide geometrical constraints that may be extracted from the images. Therefore, a first operation may be carried out by studying the type of constraint provided by an elementary edge intersection.

Assume that the two edges $\epsilon_n$ and $\epsilon_m$ intersect at the point $p_k$ on the image ($n \neq m$), and let $\Pi_n$ and $\Pi_m$ be the two associated shadow planes with coordinate vectors $\overline{\omega}_n$ and $\overline{\omega}_m$ as shown in FIG. 12. Let $\overline{x}_k$ be the homogeneous coordinate vector of $p_k$ on the image plane, and $Z_k$ the depth of the corresponding point $P_k$ in the scene. The two edges $\epsilon_n$ and $\epsilon_m$ intersect in space at $P_k$ if and only if the planes $\Pi_n$ and $\Pi_m$ and the scene surface intersect at a unique point in space ($P_k$). Equivalently, the depth $Z_k$ may be computed by triangulation using either plane $\Pi_n$ or $\Pi_m$. This condition translates into the two constraint equations $Z_k = 1/<\overline{\omega}_n, \overline{x}_k> = 1/<\overline{\omega}_m, \overline{x}_k>$ in dual-space which can be rewritten as follows:

$$<\overline{x}_k, \overline{\omega}_n - \overline{\omega}_m> = 0$$

This unique equation captures then all the information that is contained into an elementary edge intersection. There is a very intuitive geometrical interpretation of that equation: Let $\Lambda_k$ be the line of intersection between the two planes $\Pi_n$ and $\Pi_m$, in space, and let $\lambda_k$ be the perspective projection of that line onto the image plane. Then, the vector $\overline{\lambda} = \overline{\omega}_n - \overline{\omega}_m$ is one coordinate vector of the line $\lambda_k$. Therefore, equation 7.3 is merely $<\overline{x}_k, \overline{\lambda}_k> = 0$, which is equivalent to enforcing the point $p_k$ to lie on $\lambda_k$ (see FIG. 12). This equation has both advantages of (a) not explicitly involving $Z_k$ (which may be computed afterwards from the shadow plane vectors) and (b) being linear in the plane vectors unknowns $\overline{\omega}_n$ and $\overline{\omega}_m$. The same constraint may also be written as a function of $\bar{u}_n$ and $\bar{u}_m$, the two $\bar{u}$-parameterization vectors of the shadow planes $\Pi_n$ and $\Pi_m$:

$$\langle \bar{y}_K, \bar{u}_N - \bar{u}_m \rangle = 0$$

where $\bar{y}_k = W^T \bar{x}_k$ (a 2-vector). Notice that this new equation remains linear and homogeneous in that reduced parameter space.

Let $N_p$ be the total number of intersection points $p_k$ ($k= 1, \ldots, N_p$) existing in the edge-web (the entire set of edges). Assume that a generic $p_k$ lies at the intersection of the two edges $\epsilon_{n(k)}$ and $\epsilon_{m(k)}$ ($n(k)$ and $m(k)$ are the two different edge indices).

The total set of constraints associated to the $N_p$ intersections may then be collected in the form of $N_p$ linear equations:

$$\forall k=1, \ldots N_p, \langle \bar{y}_k, \bar{u}_{m(k)} - \bar{u}_{n(k)} \rangle = 0$$

which may also be written in a matrix form:

$$A\bar{U} = 0_{Np}$$

where $0_{Np}$ is a vector of $N_p$ zeros, A is an $N_p \times 2N$ matrix (function of the $\bar{y}_k$ coordinate vectors only) and $\bar{U}$ is the vector of reduced plane coordinate (of length 2N):

$$\bar{U} = [\bar{u}_1^T \ \bar{u}_2^T \ \ldots \ ]^T = [u_x^1 \ u_y^1 \ u_x^2 \ u_y^2 \ \ldots \ ]^T.$$

The vector $\bar{U} = \{\bar{u}_i\}_{i \ldots N}$.

According to this equation, the solution for the shadow plane vectors lies in the null space of the matrix A. The rank of that matrix or equivalently the dimension of its null space are identified at 1120, isolated edges and isolated group of edges are rejected. This forms an edge web which is fully connected, resulting in a set of an edges $\xi_I$ and $N_P$ intersection points $p_K$.

An edge-web is fully connected if and only if it cannot be partitioned into two groups of edges which have less that two (zero or one) points in common. In particular a fully connected edge-web does not contain any isolated edge. Notice that under the condition only, depth information can freely propagate though the entire web. A normal scanning scenario is then defined as a scenario where the edge-web is fully connected and the total number of intersections is larger than 2N (this last condition will be relaxed later on).

In a normal scanning scenario, the rank of the matrix A is exactly 2N-3 (or alternatively, the null space of A is of dimension 3).

This is because in a normal scanning scenario, the reconstruction problem has at most three parameters. Consequently the dimension of the null space of A is at most 3, or equivalently, A is of rank at least 2N-3 in fact, usually exactly 2N-3. At 1130, a unitary seed vector $U_0$ is calculated. The scene factor is calculated using singular value decomposition or SVD.

For every solution vector $\bar{U} = \{\bar{u}_i\}$ to the equation, there exists three scalars $\alpha$, $\beta$ and $\lambda$ such that:

$$\forall i=1, \ldots, N, \bar{u}_i = y\bar{u}_i^0 + \bar{u}_0$$

which are also obtained at 1130 with $\bar{u}_0 = [\alpha \ \beta]^T$. Conversely, for any scalars $\alpha$, $\beta$ and $\varsigma$, the vector $\bar{U} = \{\bar{u}_i\}$ given by the equation is solution of a linear system. The vector $\bar{U}^0$ is called a "seed" solution from which all solutions of the linear system may be identified.

Any non-trivial solution vector $\bar{U}^0 = \{\bar{u}_i^0\}$ may be used as seed as long as it is one solution of the equation the solution vector (called the unitary seed vector) that satisfies the two extra normalizing conditions: (a)

$$\sum_{i=1}^{N} \bar{u}_i^0 = 0 \text{ (zero mean)},$$

(b)

$$\sum_{i=1}^{N} \|\bar{u}_i^0\|^2 = 1$$

(unit norm) may be used. Those conditions assure a non trivial solution meaning that all $\bar{u}_I$ cannot be identical. The unitary seed vector $\bar{U}^0$ satisfies the linear equation B $\bar{U}^0 = o_{n2-0}$, where b is the following augmented $(N_p-2) \times 2N$ matrix:

$$B = \begin{bmatrix} A \\ 1 \ 0 \ 1 \ 0 \ \ldots \ 1 \ 0 \\ 0 \ 1 \ 0 \ 1 \ \ldots \ 0 \ 1 \end{bmatrix}$$

The last two rows of B enforce the zero-mean constraint, bringing the rank of B to 2N-1 (=(2N-3)+2). Therefore, the dimension of null space of B is one, leading to $\bar{U}^0$ being the unitary eigenvector associated to the unique zero eigenvalue of B. Consequently, a standard singular value decomposition (SVD) of B allows to naturally retrieve $\bar{U}^0$. Such a decomposition leads to the following relation:

$$B = U \ S \ V^T$$

where U and $V = [V_1 \ V_2 \ \ldots \ V_{2N}]$ are two unitary matrices of respective sizes $(N_p+2) \times (N_p+2)$ and $2N \times 2N$, and S is the $(N_p+2) \times 2N$ matrix of singular values. The unitary seed vector $\bar{U}^0$ is then the column vector of V associated to the zero singular value. Without loss of generality, assume it is the last column vector: $\bar{U}^0 = \{\bar{u}_i^0\} = V_{2N}$. Alternatively, one may retrieve the same V matrix by applying the same decomposition on the smaller $2N \times 2N$ symmetric matrix $C = B^T B$. Such a matrix substitution is advantageous because the so-defined matrix, C, has a simple block structure:

$$C = \begin{bmatrix} C_{1,1} & C_{1,2} & \cdots & C_{1,N} \\ C_{2,1} & C_{2,2} & \cdots & C_{2,N} \\ \vdots & \vdots & \ddots & \vdots \\ C_{N,1} & C_{N,2} & \cdots & C_{N,N} \end{bmatrix}$$

where each matrix element $C_{ij}$ is of size $2 \times 2$.

Two shadow edges can only intersect once (two shadow planes intersect along a line that can only interest the scene at a single point). All matrices $C_{ij}$ have the following expressions:

$$C_{ij} = I_2 - \overline{Y}_{k(ij)}\overline{Y}_{k(ij)}^T \quad \text{if } i \neq j$$

$$C_{i,i} = I_2 - \sum_{n=1}^{N} \overline{Y}_{k(i,n)}\overline{Y}_{k(i,n)}^T$$

where $I_2$ is the 2×2 identity matrix. Observe that, every off-diagonal matrix element $C_{ij}$ (i≠j) depends only on the intersection point $p_{k(ij)}$ between edges $\epsilon_I$ and $\epsilon_j$. Every diagonal block $C_{i,i}$ however is function of all the intersection points of $\epsilon_1$ with the rest of the edge-web (the sum is over all points $p_{k(i,n)}$, for n=(1, ..., N).

Once the C matrix is built, V is retrieved by singular value decomposition (1130; FIG. 11). This technique allows then for a direct identification of the unitary seed solution of $$\overline{U}^0 = \{\overline{u}_i^0\}$$

leading the set of all possible solutions of the equation. Euclidean reconstruction is thus achieved up to the three parameters α, β and λ.

Once the seed solution $\overline{U}^0 = \{\overline{u}_i^0\}$ is found (by SVD), one may identify the final "Euclidean" solution $\overline{U} = \{\overline{u}_i\}$ at 1140 if the depth of (at least) three points in the scene are known. Without loss of generality, assume that these points are $p_k$ for k=1, 2, 3 (with depths $Z_k$). Those points provide then three linear equations in the unknown coefficient vector $\overline{\alpha} = [\alpha, \beta, \gamma]^T$ $$[\overline{y}_k^T \langle \overline{u}_{n(k)}^0, \overline{y} \rangle] \overline{\alpha} = 1/Z_k - \langle \overline{\omega}_0, \overline{x}_k \rangle$$

for k=1, 2, 3 resulting into a linear system of three equations and three unknowns. This system may then be solved, yielding the three coefficients α, β and λ, and therefore the final solution vector $\overline{U}$. Complete Euclidean shape reconstruction is thus achieved. If more points are used as initial depths, the system may be solved in the least squares sense (once again optimal in the inverse depth error sense). Notice that the reference depth points do not have to be intersection points as the equation contends. Any three (or more) points in the edge-web may be used.

While the above has described strict reconstruction, other clues about the scene may also be used. These clues may include planarity of portions on the scene, angles between the different planes, or mutual distances between points in space. Any of these geometric clues can help either simplify the calculations, or make the calculations more strictly Euclidean. Another embodiment, shown in FIG. 14, generalizes the above operation to use with multiple light sources. Using the notation above, two calibrated light sources may be used. In this case, the matrix A has a rank that is increased to 2N-2. To shadow planes from the two light sources S1 and S2 can intersect at least at two points in the scene. As described above, depth information at those two points can then propagate along the two edges. They also propagate to the rest of the edge web as described above.

Figure 14:
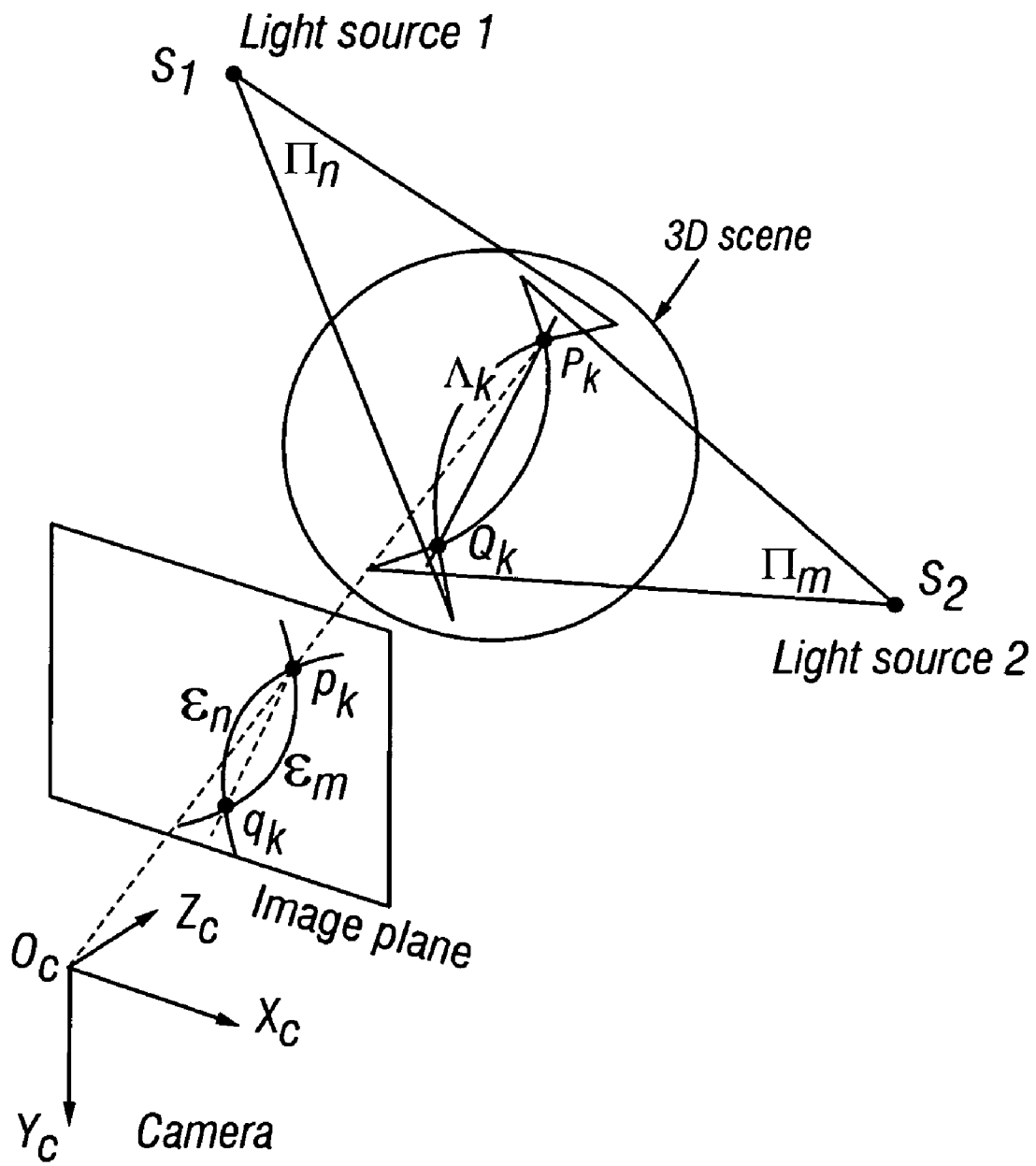
FIG. 14 shows double-edged intersection using dual light sources.

Two shadow planes Πn and Πm are generated from the two light sources as shown in FIG. 14. Two corresponding shadow edges ξn and ξm intersect on the image plane at the two points P. Depth information at $P_k$ and qk propagates through the shadow edges for and am. This provides further information which can be used for further detection of information in the scene.

B-Dual-Space Geometry

The notation in the foregoing refers to "Dual Space" and "B-shape". The meaning of this notation is further described herein. All definitions are given in Euclidean space as well as in projective geometry. A mathematical formalism called B-dual-space geometry is derived from projective geometry. This formalism enables us to explore and compute geometrical properties of three-dimensional scenes with simple and compact notation. This will be illustrated in the following chapter when applying that formalism to the problem of camera calibration.

Let (E) be the 3D Euclidean space. For a given position of a camera in space we define $\mathcal{F} = (O_c, X_c, Y_c, Z_c)$ as the standard frame of reference (called "camera reference frame") where $O_c$ is the camera center of projection, and the three axes $(O_c, X_c)$, $(O_c, Y_c)$ and $(O_c, Z_c)$ are mutually orthogonal and right-handed ($(O_c, X_c)$ and $(O_c, Y_c)$ are chosen parallel to the image plane).

We may then refer to a point P in space by its corresponding Euclidean coordinate vector $\overline{X} = [X\ Y\ Z]^T$ in that reference frame $\mathcal{F}$. The Euclidean space may also be viewed as a three-dimensional projective space $\mathcal{P}^3$. In that representation, the point P is alternatively represented by the homogeneous 4-vector $\overline{X} \simeq [X\ Y\ Z\ 1]^T$. The sign $\simeq$ denotes a vector equality up to a non-zero scalar. Therefore, any scaled version of $[X\ Y\ Z\ 1]^T$ represents the same point in space.

A plane Π in space is defined as the set of points P of homogeneous coordinate vector $\overline{X}$ that satisfy:

$$\langle \overline{\pi}, \overline{X} \rangle = 0 \quad (2.1)$$

where $\pi \simeq [\pi_x, \pi_y, \pi_z, \pi_t]$ is the homogeneous 4-vector parameterizing the plane Π (<.> is the standard scalar product operator). Observe that if $\overline{\pi}$ is normalized such that $\pi_x^2 + \pi_y^2 + \pi_z^2 = 1$, then $\overline{n}_x = [\pi_x, \pi_y, \pi_z]^T$ is the normal vector of the plane Π (in the camera reference frame $\mathcal{F}$) and $d_\pi = -\pi_t$ its orthogonal (algebraic) distance to the camera center $O_c$.

Image Plane and Perspective Projection

Let (I) be the 2D image plane. The image reference frame is defined as $(c, x_c, y_c)$ where c is the intersection point between $(O_c, Z_c)$ (optical axis) and the image plane, and (c, $x_c$) and (c, $y_c$) are the two main image coordinate axes (parallel to $(O_c, X_c)$ and $(O_c, Y_c)$). The point c is also called optical center or principal point.

Let p be the projection on the image plane of a given point P of coordinates $\overline{X} = [X\ Y\ Z]^T$, and denote $\overline{x} = [x\ y]^T$ its coordinate vector on the image plane. Then, the two vectors $\overline{X}$ and $\overline{x}$ are related through the perspective projection equation:

$$\overline{x} = \begin{bmatrix} x \\ y \end{bmatrix} = \frac{1}{Z} \begin{bmatrix} X \\ Y \end{bmatrix} \quad (2.2)$$

This projection model is also referred to as a "pinhole" camera model.

In analogy to Euclidean space, it is sometimes useful to view the image plane as a two-dimensional projective space $\mathcal{F}^2$. In that representation, a point p on the image plane has homogeneous coordinate vector $\bar{x} \simeq [x\ y\ 1]^T$. Similarly to $\mathcal{F}^3$, any scaled version of $[x\ y\ 1]^T$ describes the same point on the image plane.

One advantage of using projective geometry is that the projection operator defined in equation 2.2 becomes a linear operator from $\mathcal{F}^3$ to $\mathcal{F}^2$.

$$\bar{x} \simeq P\bar{X} \text{ with } P = [I_{3\times 3}\ 0_{3\times 1}] \quad (2.3)$$

where $\bar{X}$ and $\bar{x}$ are the homogeneous coordinates of P and p respectively, $I_{3\times 3}$ is the 3×3 identify matrix and $0_{3\times 1}$ is the 3×1 zero-vector. Observe from equation 2.3 that $\bar{x}$ is equal (up to a scale) to the Euclidean coordinate vector $\overline{X} = [X\ Y\ Z]$ of P:

$$\bar{x} \simeq \overline{X} \quad (2.4)$$

Therefore $\bar{x}$ is also referred to as the optical ray direction associated to P.

A line $\lambda$ on the image plane is defined as the set of points p of homogeneous coordinate vectors $\bar{x}$ that satisfy:

$$\langle \bar{\lambda}, \bar{x} \rangle = 0 \quad (2.5)$$

where $\bar{\lambda} = [\lambda_x\ \lambda_y\ \lambda_z]^T$ is the homogeneous 3-vector defining the line $\lambda$. Observe that if $\bar{\lambda}$ is normalized such that $\lambda_x^2 + \lambda_y^2 = 1$, then $\bar{n}_\lambda = [\lambda_x\ \lambda_y]^T$ is the normal vector of the line $\lambda$ (in the image reference frame) and $d_\lambda = -\lambda_z$ its orthogonal (algebraic) distance to the principal point c.

Claim 1: Let $p_1$ and $p_2$ be two distinct points on the image plane with respective homogeneous coordinate vectors $\bar{x}_1$ and $\bar{x}_2$. Then, it is straightforward to show that the line $\lambda$ connecting $p_1$ and $P_2$ has homogeneous coordinate vector $\bar{\lambda} \simeq \bar{x}_1 \times \bar{x}_2$, where x is the standard vector product operator in $\mathbb{R}^3$.

Claim 2: Let $\lambda_1$ and $\lambda_2$ be two distinct lines on the image plane with respective homogeneous coordinate vectors $\bar{\lambda}_1$ and $\bar{\lambda}_2$. Then, the point of intersection p between the two lines $\lambda_1$ and $\lambda_2$ has homogeneous coordinate vector $\bar{x} \simeq \bar{\lambda}_1 \times \bar{\lambda}_2$. If the two lines are parallel then the last coordinate of $\bar{x}$ is zero. In that case p is a point at infinity.

There exists useful relations between lines on the image plane and planes in space, as illustrated by the two following examples.

EXAMPLE 1

Consider a line $\lambda$ on the image plane of coordinate vector $\bar{\lambda} = [\lambda_x\ \lambda_y\ \lambda_z]^T$. Then, the set of points P in space that project onto $\lambda$ is precisely the plane $\Pi_\lambda$ spanned by $\lambda$ and the camera $O_c$. Let $\bar{\pi}_\lambda$ be the coordinate vector of $\Pi_\lambda$. Let us compute $\bar{\pi}_\lambda$ as a function of $\bar{\lambda}$. According to equations 2.3 and 2.5, a point P of homogeneous coordinate vector $\bar{X}$ will lie on $\Pi_\lambda$ if and only if:

$$\langle \bar{\lambda}, P\bar{X} \rangle = 0 \quad (2.6)$$

this relation enforces the projection of P to lie on $\lambda$. This may be alternatively written:

$$\langle P^T \bar{\lambda}, \bar{X} \rangle = 0 \quad (2.7)$$

Therefore the plane coordinates $\bar{\pi}_\lambda$ has the following expression:

$$\bar{\pi}_\lambda \simeq P^T \bar{\lambda} = \begin{bmatrix} \bar{\lambda} \\ 0 \end{bmatrix} = \begin{bmatrix} \lambda_x \\ \lambda_y \\ \lambda_z \\ 0 \end{bmatrix} \quad (2.8)$$

EXAMPLE 2

Consider two planes in space $\Pi_1$ and $\Pi_2$ of respective coordinate vectors $\bar{\pi}_1 \simeq [\pi_{x_1}\ \pi_{y_1}\ \pi_{z_1}\ \pi_{t_1}]^T$ and $\bar{\pi}_2 \simeq [\pi_{x_2}\ \pi_{y_2}\ \pi_{z_2}\ \pi_{t_2}]^T$. Assume the two planes intersect along line $\Lambda$ in space, and call $\lambda$ the resulting image line after projection of $\Lambda$ onto the image plane. Let us compute the coordinate vector $\bar{\lambda}$ of $\lambda$ as a function of $\bar{\pi}_1$ and $\bar{\pi}_2$. Consider a point P on $\Lambda$ and denote p its projection on the image plane. Since P lies on $\Pi_1$ and $\Pi_2$, its homogeneous coordinate vector $\overline{X} \simeq [X\ Y\ Z\ 1]^T$ must satisfy the following system:

$$\begin{cases} \pi_{x_1} X + \pi_{y_1} Y + \pi_{z_1} Z + \pi_{t_1} = 0 & (L_1) \\ \pi_{x_2} X + \pi_{y_2} Y + \pi_{z_2} Z + \pi_{t_2} = 0 & (L_2) \end{cases} \quad (2.9)$$

This system yields:

$$(\pi_{t_2}\pi_{x_1} - \pi_{t_1}\pi_{x_2})X + (\pi_{t_2}\pi_{y_1} - \pi_{t_1}\pi_{y_2})Y + (\pi_{t_2}\pi_{z_1} - \pi_{t_1}\pi_{z_2})Z = 0. \quad (2.10)$$

Since the homogeneous coordinate vector of p is $\bar{x} \simeq \overline{X} = [X\ Y\ Z]^T$, equation 2.10 reduces to a standard image line equation:

$$\langle \bar{\lambda}, \bar{x} \rangle = 0 \quad (2.11)$$

where $$\bar{\lambda} \simeq \begin{bmatrix} \pi_{t_2}\pi_{x_1} - \pi_{t_1}\pi_{x_2} \\ \pi_{t_2}\pi_{y_1} - \pi_{t_1}\pi_{y_2} \\ \pi_{t_2}\pi_{z_1} - \pi_{t_1}\pi_{z_2} \end{bmatrix} \quad (2.12)$$

that is the coordinate vector of $\lambda$, projector of $\Lambda = \Pi_1 \cap \Pi_2$.

Rigid Body Motion Transformation

Consider a set on N points $P_i$ in space (i=1, ..., N), and let $\overline{X}_i = [X_i\ Y_i\ Z_i]^T$ be their respective coordinate vectors in the camera reference frame $\mathcal{F}$. Suppose the camera moves to a new location in space, and let $\overline{X}_i' = [X_i'\ Y_i'\ Z_i']^T$ be the coordinate vectors of the same points $P_i$ in the new camera reference frame $\mathcal{F}'$. Then $\overline{X}_i$ and $\overline{X}'_i$ are related to each other through a rigid body motion transformation:

$$\forall i=(1, \ldots N),\ \overline{X}_i' = R\overline{X}_i + T \quad (2.13)$$

Where $R \in SO(3)$, which is a special orthogonal 3×3 matrix, and T are respectively a 3×3 rotation matrix and a 3-vector that uniquely define the rigid motion between the two camera positions. The matrix R is defined by a rotation vector $\overline{\Omega} = [\Omega_x\ \Omega_y\ \Omega_z]^T$ such that:

$$R = e^{\overline{\Omega}\wedge} \quad (2.14)$$

where $\overline{\Omega}\Lambda$ is the following skew-symmetric matrix:

$$\overline{\Omega}\Lambda = \begin{bmatrix} 0 & -\Omega_z & \Omega_y \\ \Omega_z & 0 & -\Omega_x \\ -\Omega_y & \Omega_x & 0 \end{bmatrix} \quad (2.15)$$

Equation 2.14 may also be written in a compact form using the Rodrigues' formula:

$$R = I_{3\times 3}\cos(\theta) + [\overline{\Omega}\Lambda]\frac{\sin(\theta)}{\theta} + [\overline{\Omega}\overline{\Omega}^T]\frac{1-\cos(\theta)}{\theta^2} \quad (2.16)$$

where $\theta = \|\overline{\Omega}\|$, and $\overline{\Omega}\overline{\Omega}^T$ is the following semi-positive definite matrix:

$$\overline{\Omega}\overline{\Omega}^T = \begin{bmatrix} \Omega_x^2 & \Omega_x\Omega_y & \Omega_x\Omega_z \\ \Omega_y\Omega_x & \Omega_y^2 & \Omega_y\Omega_z \\ \Omega_z\Omega_x & \Omega_z\Omega_y & \Omega_z^2 \end{bmatrix} \quad (2.17)$$

The fundamental rigid body motion equation 2.13 may also be written in projective space $\mathcal{P}^3$. In $\mathcal{P}^3$, the point $P_i$ has homogeneous coordinate vectors $\overline{X}_i \simeq [X_i \ Y_i \ Z_i \ 1]^T$ and $\overline{X}_i' \simeq [X_i' \ Y_i' \ Z_i' \ 1]^T$ in the first ($\mathcal{F}$) and second ($\mathcal{F}'$) reference frames respectively. Then, equation 2.13 may be written:

$$\overline{X}_i' \simeq D\overline{X}_i \text{ with } D = \begin{bmatrix} R & T \\ 0_{1\times 3} & 1 \end{bmatrix} \quad (2.18)$$

where $0_{1\times 3}$ is a 1×3 zero row vector. Observe that the inverse relation may also be written as follows:

$$\overline{X}_i \simeq D^{-1}\overline{X}_i' \text{ with } D^{-1} = \begin{bmatrix} R^T & -R^TT \\ 0_{1\times 3} & 1 \end{bmatrix} \quad (2.19)$$

Let $p_i'$ be the projection of $P_i$ onto the second camera image plane, and let $\overline{x}_i'$ be the homogeneous coordinate vector. Then, following the equation 2.3, we have:

$$\overline{x}_i' \simeq P\overline{X}_i' \quad (2.20)$$

which may be also written:

$$\overline{x}_i' \simeq P'\overline{X}_i \quad (2.21)$$

where: which may be also written:

$$P' = PD = [RT] \quad (2.22)$$

The matrix $P'$ is the projection matrix associated to the second camera location.

Consider now a plane $\Pi$ of homogeneous coordinate vectors $\overline{\pi}$ and $\overline{\pi}'$ in both camera reference frames $\mathcal{F}$ and $\mathcal{F}'$. How do $\overline{\pi}$ and $\overline{\pi}'$ relate to each other? Consider a generic point P on $\Pi$ with homogeneous coordinate vectors $\overline{X}$ and $\overline{X}'$ in both reference frames. According to equation 2.1, we have:

$$\langle\overline{\pi},\overline{X}\rangle = 0 \quad (2.23)$$

which successively implies:

$$\langle\overline{\pi},D^{-1}\overline{X}_i'\rangle = 0 \quad (2.24)$$

$$\langle D^{-T}\overline{\pi},\overline{X}_i'\rangle = 0 \quad (2.25)$$

Therefore:

$$\overline{\pi}' \simeq D^{-T}\overline{\pi} = \begin{bmatrix} R & 0_{3\times 1} \\ -T^TR & 1 \end{bmatrix}\overline{\pi} \quad (2.26)$$

Similarly, the plane coordinate vector before motion $\overline{\pi}$ may be retrieved from $\overline{\pi}'$ through the inverse expression:

$$\overline{\pi} \simeq D^T\overline{\pi}' = \begin{bmatrix} R^T & 0_{3\times 1} \\ T^T & 1 \end{bmatrix}\overline{\pi}' \quad (2.27)$$

In order to put in practice these concepts, let us go through the following example:

EXAMPLE 3

In the second reference frame $\mathcal{F}'$ (after camera motion), consider a line $\lambda'$ on the image plane, and the plane $\Pi$ that this line spans with the camera center (similarly to example 1. Let $\overline{\lambda}'$ and $\overline{\pi}'$ be the homogeneous coordinate vectors of $\lambda'$ and $\Pi$ in $\mathcal{F}'$. Let us compute $\overline{\pi}$, the coordinate vector of $\Pi$ in the initial camera reference frame $\mathcal{F}$(before motion) as a function of $\overline{\lambda}'$, R and T.

According to equation 2.8, $\overline{\pi}'$ and $\overline{\lambda}'$ are related through the following expression:

$$\overline{\pi}' \simeq \begin{bmatrix} \overline{\lambda}' \\ 0 \end{bmatrix} \quad (2.28)$$

Then, $\overline{\pi}$ may be calculated from $\overline{\pi}'$ using equation 2.27:

$$\overline{\pi} \simeq D^T\overline{\pi}' = \begin{bmatrix} R^T & 0_{3\times 1} \\ T^T & 1 \end{bmatrix}\begin{bmatrix} \overline{\lambda}' \\ 0 \end{bmatrix} = \begin{bmatrix} R^T\overline{\lambda}' \\ \langle T,\overline{\lambda}'\rangle \end{bmatrix} = P'^T\overline{\lambda}' \quad (2.29)$$

where P' is the projection matrix associated to the second camera location (eq. 2.22). Observe the similarity between equations 2.8 and 2.29.

Definition of B-Dual-Space

As presented in the previous section, a plane $\Pi$ in space is represented by an homogeneous 4-vector $\overline{\pi} \simeq [\pi_x \ \pi_y \ \pi_z \ \pi_t]^T$ in the camera reference frame $\mathcal{F}=(0_c,X_c,Y_c,Z_c)$ (see equation 2.1). Alternatively, if $\Pi$ does not contain the camera center $O_c$ (origin of $\mathcal{F}$) then it may be represented by a 3-vector $\overline{\omega}=[\omega_x \ \omega_y \ \omega_z]^T$, such that:

$$\langle\overline{\omega},\overline{X}\rangle = 1 \quad (2.30)$$

for any point $P\in\Pi$ of coordinate vector $\overline{X}=[X \ Y \ Z]^T$ in $\mathcal{F}$. Notice that $\overline{\omega}=\overline{n}_\pi/d_\pi$ where $\overline{n}_\pi$ is the unitary normal vector of the plane and $d_{\pi \neq}0$ its distance to the origin. Let $(\Omega)=\mathbb{R}^3$. Since every point $\overline{\omega}\epsilon(\Omega)$ corresponds to a unique plane $\Pi$ in Euclidean space (E), we refer to $(\Omega)$ as the 'plane space' or 'B-dual-space'. For brevity in notation, we will often refer to this space as the dual-space. There exists a simple relationship between plane coordinates in projective geometry and dual-space geometry:

$$\overline{\omega} = -\frac{1}{\pi_t} \begin{bmatrix} \pi_x \\ \pi_y \\ \pi_z \end{bmatrix} \text{ if } \pi_t \neq 0 \qquad (2.31)$$

In that sense, dual-space geometry is not a new concept in computational geometry. Originally, the dual of a given vector space (E) is defined as the set of linear forms on (E) (linear functions of (E) into the reals $\mathbb{R}$). In the case where (E) is the three dimensional Euclidean space, each linear form may be interpreted as a plane $\Pi$ in space that is typically parameterized by a homogeneous 4-vector $\overline{\pi} \simeq [\pi_x, \pi_y, \pi_z, \pi_t]^T$. A point P of homogeneous coordinates $\overline{X} = [X\ Y\ Z\ 1]^T$ lies on a generic plane $\Pi$ of coordinates $\overline{\pi}$ if and only if $\langle \overline{\pi}, \overline{X} \rangle = 0$ (see [13]). Our contribution is mainly the new $\overline{\omega}$-parameterization. We will show that this representation exhibits useful properties allowing us to naturally relate objects in Euclidean space (planes, lines and points) to their perspective projections on the image plane (lines and points). One clear limitation of that representation is that plane crossing the camera origin cannot be parameterized using that formalism (for such planes $\pi_t=0$). However, this will be shown not to be a critical issue in all geometrical problems addressed in this thesis (as most planes of interest do not contain the camera center).

Properties of B-Dual Space

This section presents the fundamental properties attached to dual-space geometry.

The following proposition constitutes the major property associated to our choice of parameterization:

Proposition 1: Consider two planes $\Pi_a$ and $\Pi_b$ in space, with respective coordinate vectors $\overline{\omega}_a$ and $\omega_b(\overline{\omega}_a \neq \overline{\omega}_b)$ in dual-space, and let $\Lambda = \Pi_a \cap \Pi_b$ be the line of intersection between them. Let $\lambda$ be the perspective projection of $\Lambda$ on the image plane, and $\overline{\lambda}$ its homogeneous coordinate vector. Then $\overline{\lambda}$ is parallel to $\overline{\omega}_a - \overline{\omega}_b$. In other words, $\overline{\omega}_a - \overline{\omega}_b$ is a valid coordinate vector of the line $\lambda$.

Proof: Let $P \epsilon \Lambda$ and let p be the projection of P on the image plane. Call $\overline{X} = [X\ Y\ Z]^T$ and $$\overline{x} \simeq \frac{1}{Z}\overline{X}$$

the respective coordinates of P and p. We successively have:

$$P \in \Lambda \Leftrightarrow \begin{cases} P \in \Pi_a \\ P \in \Pi_b \end{cases}$$

$$\Leftrightarrow \begin{cases} \langle \overline{\omega}_a, \overline{X} \rangle = 1 \\ \langle \overline{\omega}_b, \overline{X} \rangle = 1 \end{cases}$$

$$\Rightarrow \langle \overline{\omega}_a - \overline{\omega}_b, \overline{X} \rangle = 0$$

-continued $$\Rightarrow \langle \overline{\omega}_a - \overline{\omega}_b, \overline{X} \rangle = 0 \quad (\text{since } Z \neq 0)$$

$$\Rightarrow \overline{\lambda} \simeq \overline{\omega}_a - \omega_b. \blacksquare$$

Notice that this relation is significantly simpler than that derived using standard projective geometry (equation 2.12).

In addition, observe that the coordinate vector $\overline{\omega}$ of any plane $\Pi$ containing the line $\Lambda$ lies on the line connecting $\overline{\omega}_a$ and $\overline{\omega}_b$ in dual-space $(\Omega)$. We denote that line by $\hat{\Lambda}$ and call it the dual image of $\Lambda$. The following definition generalizes that concept of dual image to other geometrical objects:

Definition: Let $\mathcal{A}$ be a sub-manifold of (E) (e.g., a point, line, plane, surface or curve). The dual image of $\mathcal{A}$ of $\mathcal{A}$ is defined as the set of coordinates vectors $\overline{\omega}$ in dual-space $(\Omega)$ representing the tangent planes to $\mathcal{A}$. Following that standard definition (see [13, 14]), the dual images of points, lines and planes in (E) may be shown to be respectively planes, lines and points in dual-space $(\Omega)$. Further properties regarding non-linear sub-manifolds may be observed, such as for quadric surfaces in [15] or for general apparent contours in space in [16].

The following five propositions cover the principal properties attached to the dual-space formalism.

Proposition 2—Parallel Planes—Horizon Line: Let $\Pi_a$ and $\Pi_b$ be two parallel planes of coordinates $\overline{\omega}_a$ and $\overline{\omega}_b$. Then $\overline{\omega}_a$ parallel to $\overline{\omega}_b$.

Proof: The planes have the same surface normals $\overline{n}_a = \overline{n}_b$. Therefore, the proposition follows from definition of $\overline{\omega}$.

The horizon line H represents the "intersection" of two planes at infinity. The dual image of H is the line $\hat{H}$ connecting $\overline{\omega}_a$ and $\overline{\omega}_b$ and crossing the origin of the $(\Omega)$ space. The direction of that line is not only the normal vector of the two planes $\overline{n}_a = \overline{n}_b$, but also the representative vector $\overline{\lambda}_H$ of the projection $\lambda_H$ of H (horizon line) on the image plane (according to proposition 1). Although H is not a well-defined line in Euclidean space (being a line at infinity), under perspective projection, it may give rise to a perfectly well defined line $\lambda_H$ on the image plane (for example a picture of the ocean). Once that line is extracted, the orientation of the plane is known:

$$\overline{\omega}_a \simeq \overline{\omega}_b \simeq \overline{\lambda}_H \qquad (2.32)$$

Proposition 3—Orthogonal Planes: If two planes $\Pi_a$ and $\Pi_b$ are two orthogonal, then so are their coordinate vectors $\overline{\omega}_a$ and $\overline{\omega}_b$ in dual-space. Consequently, once one of the plane $\overline{\omega}_a$ is known, then $\overline{\omega}_b$ is constrained to lie in the sub-space orthogonal to $\overline{\omega}_a$, a plane in dual-space.

Proposition 4—Intersecting lines: Consider two lines $\Lambda_a$ and $\Lambda_b$ intersecting at a point P, and call $\Pi$ the plane that contains them. In dual-space, the two dual lines $\hat{\Lambda}_a$ and $\hat{\Lambda}_b$ necessarily intersect at $\overline{\omega}$ the coordinate vector of $\Pi$ (since $\overline{\omega}$ is the plane that contains both lines). Similarly, the dual image $\hat{P}$ of P is the plane in dual-space that contains both dual lines $\hat{\Lambda}_a$ and $\hat{\Lambda}_b$. Notice that $\hat{P}$ does not cross the origin of $(\Omega)$.

Proposition 5—Parallel lines—Vanishing Point: Consider two parallel lines $\Lambda_a$ and $\Lambda_b$ belonging to the plane $\Pi$ of coordinates $\overline{\omega}$. Then $\overline{\omega}$ is at the intersection of the two dual lines $\hat{\Lambda}_a$ and $\hat{\Lambda}_b$. In dual-space, the plane containing both dual lines $\hat{\Lambda}_a$ and $\hat{\Lambda}_b$ is the dual image of $\hat{V}$ of the vanishing point V, i.e., the intersection point of $\Lambda_a$ and $\Lambda_b$ in Euclidean space. If H is the horizon line associated with $\Pi$, then $V \epsilon H$, which translates in dual-space into $\hat{H} \epsilon \hat{V}$. Since $\hat{H}$ contains the origin, so does $\hat{V}$. Notice that once the perspective projection v of V is observable on the image plane, the plane $\hat{V}$ is entirely known (since its orientation is the coordinate vector of v).

Proposition 6—Orthogonal lines: Let $\Lambda_1$ and $\Lambda_2$ be two orthogonal lines contained in the plane $\Pi$ of coordinates $\bar{\omega}$) and let $\bar{\omega}=\hat{\Lambda}_1 \cap \hat{\Lambda}_2$. Consider the set of planes orthogonal to $\Pi$. In the dual-space, that set is represented by a plane containing the origin, and orthogonal to $\bar{\omega}$ (see proposition 3). Call that plane $\hat{V}$ (it can be shown to be the dual image of a vanishing point). In that set, consider the two specific planes $\Pi_1$ and $\Pi_2$ that contain the lines $\Lambda_1$ and $\Lambda_2$. In the dual-space, the representative vectors $\bar{\omega}_1$ and $\bar{\omega}_2$ of those two planes are defined as the respective intersections between $\hat{V}$ and the two lines $\hat{\Lambda}_1$ and $\hat{\Lambda}_2$. Then, since the two lines $\Lambda_1$ and $\Lambda_2$ are orthogonal, the two vectors $\bar{\omega}_1$ and $\bar{\omega}_2$ are also orthogonal. This implies that the images of the two vanishing points $\hat{V}_1$ and $\hat{V}_2$ associated to the lines $\Lambda_1$ and $\Lambda_2$ are orthogonal in the dual-space. Two vanishing points are enough to recover the horizon line H associated with a given plane $\Pi$ in space. Therefore, observing two sets of parallel lines belonging to the same plane under perspective projection allows us to recover the horizon line, and therefore the orientation of the plane in space (from proposition 2). The horizon line H corresponding to the ground floor $\Pi$ is recovered from the two vanishing points $V_1$ and $V_2$.

2.2.3 Geometrical Problems Solved in B-Dual-Space

This section presents several useful geometrical problems solved using dual-space geometry.

EXAMPLE 4

Let $\Pi$ be a plane in space of coordinate vector $\bar{\omega}$. Let P be a point on H with coordinate vector $\bar{X}=[X\ Y\ Z]^T$. Let p be the projection of P onto the image plane, and denote $\bar{x} \simeq [x\ y\ 1]^T$ its homogeneous coordinate vector. The triangulation problem consists of finding the point P from its projection p and the plane $\Pi$, or calculating $\bar{X}$ from $\bar{x}$ and $\bar{\omega}$. Since P lies on the optical ray $(O_c, p)$, its coordinate vector satisfies $\bar{X} \simeq \bar{x}$ or equivalently, $\bar{X}=Z\bar{x}$, with $\bar{x}=[x\ y\ 1]^T$. In addition, since P lies on the plane $\Pi$, we have $<\bar{\omega},\bar{X}>=1$. This implies:

$$Z = \frac{1}{\langle\bar{\omega}, \bar{x}\rangle} \Rightarrow \bar{X} = \frac{\bar{x}}{\langle\bar{\omega}, \bar{x}\rangle} \tag{2.33}$$

This is the fundamental triangulation equation between a ray and a plane in space.

EXAMPLE 5

Consider two camera frames $\mathcal{F}$ and $\mathcal{F}'$ and let $\{R, T\}$ be the rigid motion parameters between $\mathcal{F}$ and $\mathcal{F}'$. Let $\Pi$ be a plane in space of coordinate vectors $\bar{\omega}$ and $\bar{\omega}'$ in $\mathcal{F}$ and $\mathcal{F}'$ respectively. How do $\bar{\omega}$ and $\bar{\omega}'$ relate to each other?

Consider a generic point P on $\Pi$ of coordinate vectors $\bar{X}$ and $\bar{X}'$ in $\mathcal{F}$ and $\mathcal{F}'$ respectively. Then, $\bar{X}'=R\bar{X}+T$. Since $P \in \Pi$, we may write:

$$<\bar{\omega}', \bar{X}'>=1 \tag{2.34}$$

$$<\bar{\omega}', R\bar{X}+T>=1 \tag{2.35}$$

$$<R^T\bar{\omega}', \bar{X}>=1-<\bar{\omega}', T> \tag{2.36}$$

$$\left\langle \frac{R^T\bar{\omega}'}{1-\langle\bar{\omega}', T\rangle}, \bar{X} \right\rangle = 1 \quad \text{if } \langle\bar{\omega}', T\rangle \neq 1 \tag{2.37}$$

Therefore:

$$\bar{\omega} = \frac{R^T\bar{\omega}'}{1-\langle\bar{\omega}', T\rangle}. \tag{2.38}$$

This expression is the equivalent of equation 2.27 in dual-space geometry. Notice that the condition $<\bar{\omega}', T> \neq 1$ is equivalent to enforcing the plane $\Pi$ not to contain the origin of the first camera reference frame $\mathcal{F}$. That is a necessary condition in order to have a well defined plane vector $\bar{\omega}$. The inverse expression may also be derived in a similar way:

$$\bar{\omega}' = \frac{R\bar{\omega}}{1+\langle\bar{\omega}, R^T T\rangle}. \tag{2.39}$$

In that case, the condition $<\bar{\omega},-R^T T> \neq 1$ constraints the plane $\Pi$ not to contain the origin of the second reference frame $\mathcal{F}'$ (in order to have a well defined vector $\bar{\omega}'$).

In some cases, only one of the two plane vectors $\bar{\omega}$ or $\bar{\omega}'$ is well-defined. The following example is one illustration of such a phenomenon.

EXAMPLE 6

Consider the geometrical scenario of example 5 where the plane $\Pi$ is now spanned by a line $\lambda'$ on the image plane of the second camera reference frame $\mathcal{F}'$ (after motion). In that case, the coordinate vector $\bar{\omega}'$ is not well defined (since by construction, the plane $\Pi$ contains the origin of $\mathcal{F}'$). However, the plane vector $\bar{\omega}$ may very well be defined since $\Pi$ does not necessarily contain the origin of the first reference frame $\mathcal{F}$. Indeed, according to equation 2.29, the homogeneous coordinate vector $\bar{\pi}$ of $\Pi$ in $\mathcal{F}$ is given by:

$$\bar{\pi} \simeq \begin{bmatrix} R^T\bar{\lambda}' \\ \langle T, \bar{\lambda}' \rangle \end{bmatrix} \tag{2.40}$$

where $\bar{\lambda}'$ is homogeneous coordinate vector of the image line $\lambda'$ in $\mathcal{F}'$. Then, according to expression 2.31, the corresponding dual-space vector $\bar{\omega}$ is given by:

$$\bar{\omega} = -\frac{R^T\bar{\lambda}'}{\langle T, \bar{\lambda}' \rangle} \tag{2.41}$$

which is perfectly well-defined as long as $\Pi$ does not contain $O_c$, or equivalently if $(T, \bar{\lambda}') \neq 0$. This condition is equivalent to enforcing the line not to contain the epipole on the image plane attached to camera frame. The point is the projection of onto the image plane attached to the second camera reference frame.

EXAMPLE 7 triangulation of an optical ray ($O_c$,P) with the plane H spanned by the line $\lambda'$ in the other camera reference frame $\mathcal{F}'$. Let $\overline{X}=[X\ Y\ Z]^T$ be the coordinates of P in space and $\overline{x}=[x\ y\ 1]^T$ the coordinates of its known projection p on the image plane. Equation 2.41 provides then an expression for the coordinate vector $\overline{\omega}$ of $\Pi$ in frame $\mathcal{F}$:

$$\overline{\omega} = -\frac{R^T\overline{\lambda}'}{\langle T, \overline{\lambda}'\rangle} \tag{2.42}$$

where $\overline{\lambda}'$ is the homogeneous coordinate vector of the image line $\lambda'$ in $\mathcal{F}'$. The triangulation expression given by equation 2.40 returns then the final coordinate vector of P:

$$\overline{X} = \frac{\overline{x}}{\langle \overline{\omega}, \overline{x}\rangle} = \frac{\langle T, \overline{\lambda}'\rangle\overline{x}}{\langle R^T\overline{\lambda}', \overline{x}\rangle} \tag{2.43}$$

Observe that the plane $\Pi$ is not allowed to cross the origin of the initial reference frame $\mathcal{F}$, otherwise, triangulation is impossible. Therefore the plane vector $\overline{\omega}$ is perfectly well defined (i.e., $(T,\overline{\lambda}')\neq 0$).

3.1.1 Camera Calibration in B-Dual-Space Geometry

The position of a point p in a real image is originally expressed in pixel units. One can only say that a point p is at the intersection of column $p_x=150$ and row $p_y=50$ on a given digitized image. So far, we have been denoting $\overline{x}=[x\ y\ 1]^T$ the homogeneous coordinate vector of a generic point p on the image plane. This vector (also called normalized coordinate vector) is directly related to the 3D coordinates $\overline{X}=[X\ Y\ Z]^T$ of the corresponding point P is space through the perspective projection operator (eq. 2.2). Since in practice we only have access to pixel coordinates $\overline{p}=[p_x\ p_y\ 1]^T$, we need to establish a correspondence between $\overline{p}$ and $\overline{x}$ (from pixel coordinates to optical ray in space).

Since the origin of the image reference frame is at the optical center c (or principal point), it is necessary to know the location of that point in the image: $\overline{c}=[c_x\ c_y]^T$ (in pixels). Let $f_o$ be the focal distance (in meters) of the camera optics (distance of the lens focal point to the imaging sensor), and denote by $d_x$ and $d_y$ the x and y dimensions of the pixels in the imaging sensor (in meters). Let $f_x=f_o/d_x$ and $f_y=f_o/d_y$ (in pixels). Notice that for most imaging sensors currently manufactured, pixels may be assumed perfectly square, implying $d_x=d_y$ or equivalently $f_x=f_y$. In the general case $f_x$ and $f_y$ may be different.

Then, the pixel coordinates $\overline{p}=[p_x\ p_y\ 1]^T$ of a point on the image may be computed from its normalized homogeneous coordinates $\overline{x}=[x\ y\ 1]^T$ through the following expression:

$$\begin{cases} p_x = f_x x + c_x \\ p_y = f_y y + c_y \end{cases} \tag{3.1}$$

That model assumes that the two axes of the imaging sensor are orthogonal. In the case where they are not orthogonal, the pixel mapping function may be generalized to:

$$\begin{cases} p_x = f_x x - \alpha f_y y + c_x \\ p_y = f_y y + c_y \end{cases} \tag{3.2}$$

where $\alpha$ is a scalar coefficient that controls the amount of skew between the two main sensor axes (if $\alpha=0$, there is no skew). For now, let us consider the simple model without skew (equation 3.1). If p is the image projection of the point P in space (of coordinates $\overline{X}=[X\ Y\ Z]^T$), the global projection map may be written in pixel units:

$$\begin{cases} p_x = f_x(X/Z) + c_x \\ p_y = f_y(Y/Z) + c_y \end{cases} \tag{3.3}$$

This equation returns the coordinates of a point projected onto the image (in pixels) in the case of an ideal pinhole camera. Real cameras do not have pinholes, but lenses. Unfortunately a lens will introduce some amount of distortion (also called aberration) in the image. That makes the projected point to appear at a slightly different position on the image. The following expression is a simple first-order model that captures the distortions introduced by the lens:

$$\begin{cases} \overline{a} = \begin{bmatrix} X/Z \\ Y/Z \end{bmatrix} = \begin{bmatrix} x \\ y \end{bmatrix} & \text{pinhole projection} \\ \overline{b} = \begin{bmatrix} b_x \\ b_y \end{bmatrix} = \overline{x}(1+k_c\|\overline{a}\|^2) & \text{radial distortion} \\ \overline{p} = \begin{bmatrix} p_x \\ p_y \end{bmatrix} = \begin{bmatrix} f_x b_x + c_x \\ f_y b_y + c_y \end{bmatrix} & \text{pixel coordinates} \end{cases} \tag{3.4}$$

where $k_c$ is called the radial distortion factor. This model is also called first-order symmetric radial distortion model ("symmetric" because the amount of distortion is directly related to the distance of the point to the optical center c). Observe that the systems (3.4) and (3.3) are equivalent when $k_c=0$ (no distortion).

Therefore, if the position of the point P is known in camera reference frame, one may calculate its projection onto the image plane given the intrinsic camera parameters $f_x$, $f_y$, $c_x$, $c_y$ and $k_c$. That is known as the direct projection operation and may be denoted $\overline{p}=\Pi(\overline{X})$. However, most 3D vision applications require to solve the "inverse problem" that is mapping pixel coordinates $\overline{p}$ to 3D world coordinates $[X\ Y\ Z]^T$. In particular, one necessary step is to compute normalized image coordinates $\overline{x}=[x\ y\ 1]^T$ (3D ray direction) from pixel coordinates $\overline{p}$ (refer to equation 3.4). The only non-trivial aspect of that inverse map computation is in computing the vector $\overline{a}$ from $\overline{b}$. This is the distortion compensation step. It may be shown that for relatively small distortions, this inverse map may be very well approximated by the following equation:

$$\overline{a} \approx \frac{\overline{b}}{1+k_c\left\|\frac{\overline{b}}{1+k_c\|\overline{b}\|^2}\right\|^2} \tag{3.5}$$

Experimentally, this expression is sufficiently accurate.

Camera Calibration

The camera calibration procedure identifies the intrinsic camera parameters $f_x$, $f_y$, $c_x$, $c_y$, and $k_c$ and possibly $\alpha$). A standard method is to acquire an image a known 3D object (a checker board pattern, a box with known geometry . . . ) and look for the set of parameters that best match the computed projection of the structure with the observed projection on the image. The reference object is also called calibration ring. Since the camera parameters are inferred from image measurements, this approach is also called visual calibration. This technique was originally presented by Tsai and Brown. An algorithm for estimation was proposed by Abdel-Aziz and Karara (for an overview on camera calibration, the reader may also refer to the book Klette, Schluns and Koschan).

Figure 5:
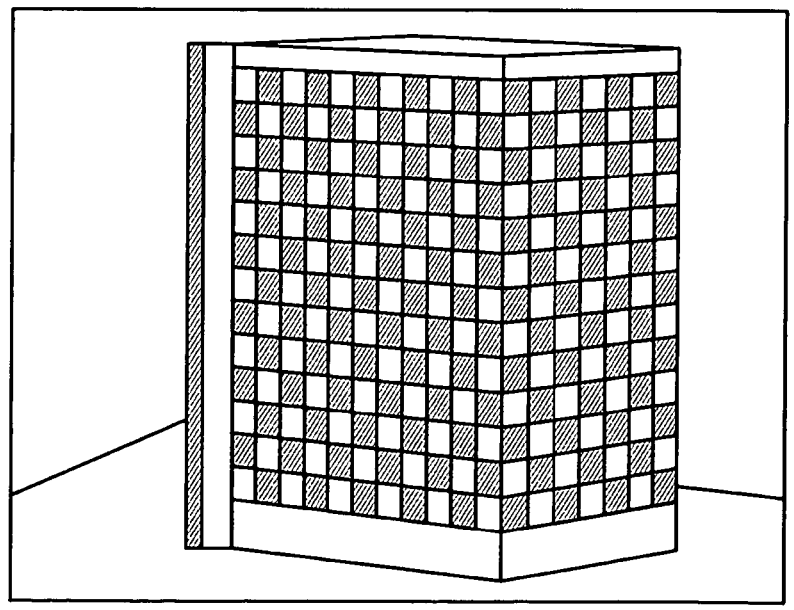
FIG. 5 shows a three dimensional calibration.

FIGS. 4A and 4B show two examples of calibration images when using a planar rig (checker board pattern). FIG. 5 shows a 3D rig (two orthogonal checker board patterns).

Note that although the geometry of the calibration rig is known (i.e., the mutual position of the grid corners in space), its absolute location with respect to the camera is unknown. In other words, the pose of the calibration pattern in unknown. Therefore, before applying the set of equations (3.4) to compute the image projection of every corner in the structure, one needs to find their 3D coordinates in the camera reference frame. We first choose a reference frame attached to the rig (called the object frame) in which we express the known coordinates $\overline{X}_o^i$ of all the corners $P_i$, ($i=1 \ldots N$). This set of vectors is known since the intrinsic rig structure is known. Then, the coordinate vector $\overline{X}_c^i$ in the camera frame is related $\overline{X}_o^i$ through a rigid motion transformation:

$$\forall i=1,\ldots, N, \overline{X}_c^i = R_c \overline{X}_o^i + T_c \quad (3.6)$$

where $R_c$ and $T_c$ define the pose of the calibration rig with respect to the camera (similarly to equation 2.13). See FIG. 3.2.

Notice that by adding the calibration object in the scene, more unknowns have been added to the problem: $R_c$ and $T_c$. Those parameters are called extrinsic camera parameters since they are dependent upon the pose of the calibration pattern with respect to the camera (unlike the intrinsic parameters that remain constant as the rig is moved in front of the camera).

Let $\overline{\Omega}_c$ be the rotation vector associated to the rotation matrix $R_c$ (see equation 2.13). Then, the complete set of unknowns to solve for is:

Focal length: $f_x$, $f_y$ (2 DOF),

Principal point coordinates: $c_x$, $c_y$ (2 DOF),

Radial distortion factor: $k_c$ (1 DOF),

Calibration rig pose: $\overline{\Omega}_c$, $T_c$ (6 DOF).

Therefore, the global calibration problem consists of solving for a total of 11 scalar parameters (adding the skew coefficient $\alpha$ would bring the number of unknowns to 12).

Let $p_i(i=1, \ldots, N)$ be the observed image projections of the rig points $P_i$ and let $\overline{p}_i=[p_x^i \ p_y^i]^T$ be their respective pixel coordinates. Experimentally, the points $p_i$ are detected using the standard Harris corner finders.

The estimation process finds the set of calibration unknowns (extrinsic and intrinsic) that minimizes the reprojection error. Therefore, the solution to that problem may be written as follows:

$$\{f_x, f_y, c_x, c_y, k_c, \overline{\Omega}_c, T_c\} = \quad (3.7)$$

$$\text{Argmin} \sum_{i=1}^{N} \left\| \overline{p}_i - (\Pi(R_c \overline{X}_o^i + T_c)) \right\|^2$$

where $R_c = e^{\overline{\Omega} \wedge}$, $\Pi(.)$ is the image projection operator defined in equation 3.4 (function of the intrinsic parameters $f_x$, $f_y$, $c_x$, $c_y$ and $k_c$) and $\|.\|$ is the standard distance norm is pixel units. This non-linear optimization problem may be solved using standard gradient descent techniques. However, it is required to have a good initial guess before starting the iterative refinement. a method to derive closed form expressions for calibration parameters that may be used for initialization is presented.

Apart from numerical implementation details, it is also important to study the observability of the model. In other words, under which conditions (type of the calibration rig and its position in space) can the full camera model (eq. 3.4) be estimated from a single image projection. For example, it is worth noticing that if the calibration rig is planar (as shown on FIG. 3.1-a) the optical center c cannot be estimated (the two coordinates $c_x$ and $c_y$). Therefore, in such cases, it is necessary to reduce the camera model to fewer intrinsic parameters and fix the optical center in the center of the image. Further discussions on the camera model observability are presented.

Closed-Form Solution in B-Dual-Space Geometry

This section demonstrates how one may easily retrieve closed-form expressions for intrinsic and extrinsic camera parameters using the dual-space formalism as a fundamental mathematical tool. The method is based on using vanishing points and vanishing lines. The concept of using vanishing points for camera calibration is not new (most of the related work on this topic may probably be found in the art. Therefore, this does not to state new concepts or theories on calibration, but rather illustrate the convenience of the dual-space formalism by applying it to the problem of calibration. We show here that this formalism enables us to keep the algebra simple and compact while exploiting all the geometrical constraints present in the scene (in the calibration rig). That will also lead us to derive properties regarding the observability of several camera models under different geometrical configuration of the setup, and types of calibration rig used (2D or 3D). Most related work on that topic only deal with simple camera model (unique focal length) and extract the extrinsic parameters through complex 3D parameterization (using Euler angles). Other standard methods for deriving explicit solutions for camera calibration were presented by Abdel-Aziz and Karara and Tsai. These methods are based on estimating, in a semi-linear way, a set of parameters that is larger than the real original set of unknowns and do not explicitly make use of all geometrical properties of the calibration rig.

The method that we disclose here involves very compact algebra, uses intuitive and minimal parameterizations, and naturally allows to exploit all geometrical properties present in the observed three-dimensional scene (calibration rig). In addition, our approach may be directly applied to natural images that do not contain a special calibration grid (such as pictures of buildings, walls, furniture . . . ).

Once it is computed, the closed-form solution is then fed to the non-linear iterative optimizer as an initial guess for the calibration parameters. This final optimization algorithm is inspired from the method originally presented by Tsai including lens distortion (see equation 3.7). The purpose of that analysis is to provide a good initial guess to the non-linear optimizer, to better insure convergence, and check for the consistency of the results.

We will first consider the case of a calibration when using a planar rig (a 2D grid), and then generalize the results to 3D rigs (such as a cube). In those two cases, different camera models will be used.

3.2.1. When Using a Planar Calibration Rig

Consider the calibration image shown in FIG. 4A. Assuming no lens distortion ($k_c=0$) and no image noise, the grid may be summarized by its four extreme corners on the image (intuitively, one may localize all the inside grid corners from those four points by simple perspective warping). In practice, all points will be used in order to be less sensitive to image noise, however the principle remains the same. Then, the basic observed pattern is a perspective view of a rectangle of known dimensions L×W. Without loss of generality, we can also assume that this rectangle is a square. The reason for that is that through a similar perspective image warping, it is always possible to convert a perspective view of a rectangle into a perspective view of a square, given that the dimensions of the original rectangle are known (actually, only the ratio W/L is necessary).

Figure 15:
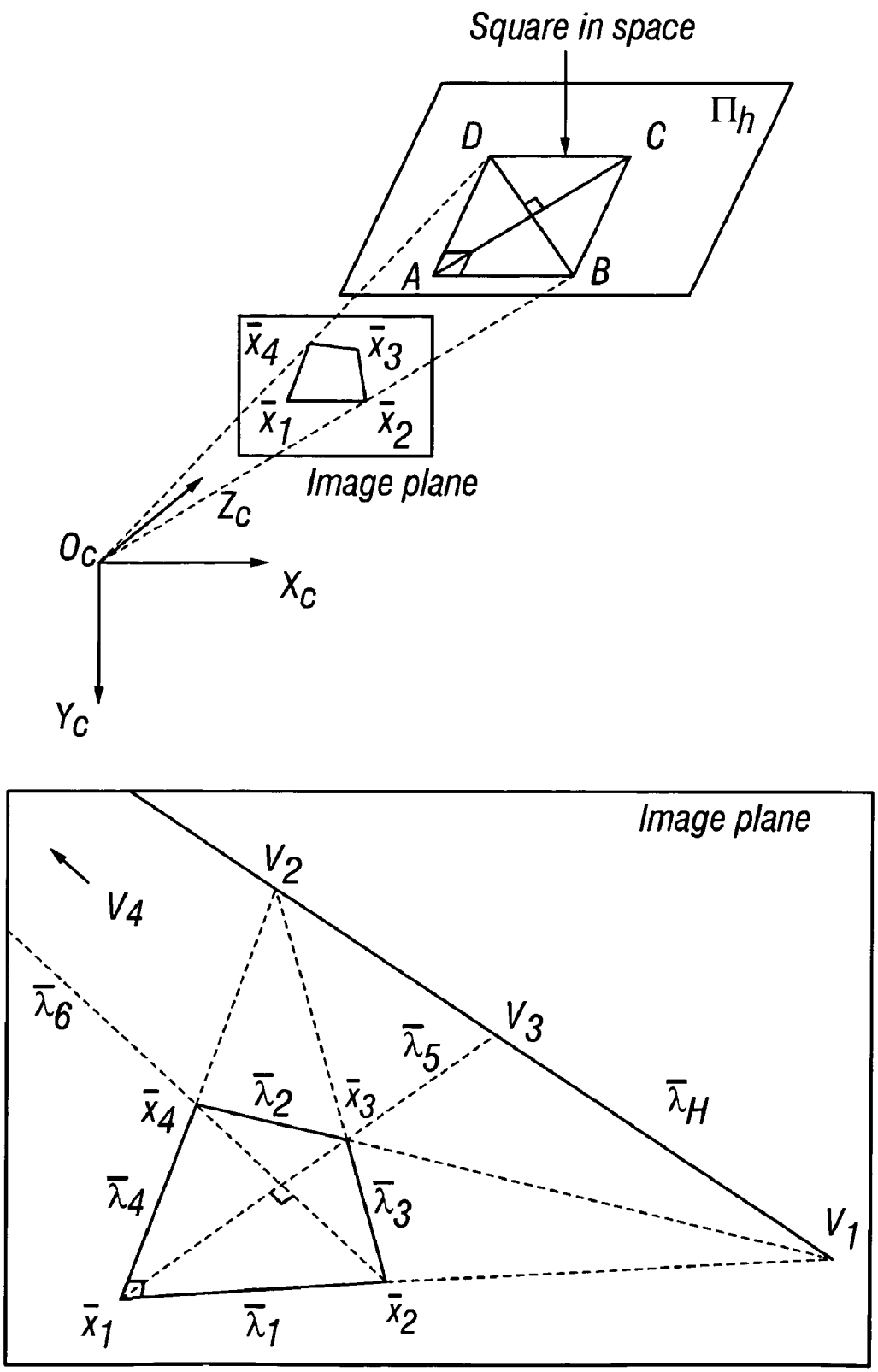
FIG. 15 shows directions of rays.

FIG. 15 shows a perspective image of a square ABCD. The four points $\bar{x}_1$, $\bar{x}_2$, $\bar{x}_3$, and $\bar{x}_4$ are the coordinate vectors of the detected corners of the square on the image plane after normalization. This means that the $\bar{x}$ vectors are computed from the pixel coordinates of the points after subtraction of the optical center coordinates ($c_x$, $c_y$) (in pixel) and scaling by the inverse of the focal length (in pixel as well). To model the aspect ration in x and y, one can assume two distinct focal lengths $f_x$ and $f_y$ in both image directions (to account for non-square CCD pixels).

In the case of calibration from planar rigs, it is known that the optical center position ($c_x$, $c_y$) cannot be estimated. Therefore, we will keep it fixed at the center of the image, and take it out of the set of unknowns. The resulting intrinsic parameters to be estimated are therefore $f_x$ and $f_y$. Let $\bar{p}_i \simeq [p_{x_i}\ p_{y_i}\ 1]^T$ (i=1, . . . , 4) be the pixel locations of the corners after subtraction of the optical center (in homogeneous coordinates). Then one can extract the $\bar{x}$ vectors through a linear operation involving the focal lengths $f_x$ and $f_y$: for i=1, . . . , 4, $$\bar{x}_i \simeq \begin{bmatrix} 1/f_x & 0 & 0 \\ 0 & 1/f_y & 0 \\ 0 & 0 & 1 \end{bmatrix} \bar{p}_i = K\bar{p}_i \quad (3.8)$$

where K is the intrinsic camera matrix containing the intrinsic parameters ($f_x$ and $f_y$). Let us now extract the set of independent constraints attached to the observation in order to estimate the focal lengths (hence the camera matrix K).

FIG. 15 shows the set of corner points $\bar{x}_i$ on the image plane. Following proposition 5 of section 2.2.2, lines $\bar{\lambda}_i$ (i= 1, . . . , 4) are used to infer the two vanishing points $V_1$ and $V_2$ in order to recover the projection $\bar{\lambda}_H$ of the horizon line H associated to the plane $\Pi_d$. The derivation is as follows:

$$\left.\begin{array}{l}\bar{\lambda}_1 \simeq \bar{x}_1 \times \bar{x}_2 \\ \bar{\lambda}_2 \simeq \bar{x}_3 \times \bar{x}_4 \\ \bar{\lambda}_3 \simeq \bar{x}_2 \times \bar{x}_3 \\ \bar{\lambda}_4 \simeq \bar{x}_4 \times \bar{x}_1\end{array}\right\}\begin{array}{l}V_1 \simeq \bar{\lambda}_1 \times \bar{\lambda}_2 \\ \\ V_2 \simeq \bar{\lambda}_3 \times \bar{\lambda}_4\end{array}\right\}\bar{\lambda}_H \simeq V_1 \times V_2 \quad (3.9)$$

where x is the standard vector product in $\mathbb{R}^3$. Notice that in order to keep the notation clear, we abusively used $V_1$ and $V_2$ to refer to the homogeneous coordinates of the vanishing points on the image plane (quantities similar to the $\bar{x}_i$'s using homogeneous coordinates). It is important to keep in mind that all equalities are defined "up to scale." For example, any vector proportional to $\bar{x}_1 \times \bar{x}_1$ would be a good representative for the same line $\bar{\lambda}_1$. The same observation holds for the coordinate vectors of the vanishing points and that of the horizon line.

Yet, the normalized coordinates $\bar{x}_i$ of the corners are not directly available, only the pixel coordinates $\bar{p}_i$. However, all $\bar{x}_i$'s can be retrieved from the $\bar{p}_i$'s through the linear equation 3.8. We will use of the following statement whose proof may be found in [30]:

Claim 1: Let K be any 3×3 matrix, and $\bar{u}$ and $\bar{v}$ any two 3-vectors. Then the following relation holds:

$$(K\bar{u}) \times (K\bar{v}) = K^*(\bar{u} \times \bar{v})$$

where K* is the adjoint of K (or the matrix of cofactors of K). Note that if K is invertible (which is the case here), then $K^* = \det(K)(K^T)^{-1}$, and consequently $K^{**} \propto K$.

Using that claim, the camera matrix K (or K*) may be factored out of the successive vector products of equations 3.9, yielding:

$$\left.\begin{array}{l}\bar{\lambda}_1 \simeq K^*\bar{\lambda}_1^p \\ \bar{\lambda}_2 \simeq K^*\bar{\lambda}_2^p \\ \bar{\lambda}_3 \simeq K^*\bar{\lambda}_3^p \\ \bar{\lambda}_4 \simeq K^*\bar{\lambda}_4^p\end{array}\right\}\begin{array}{l}V_1 \simeq KV_1^p \\ \\ V_2 \simeq KV_2^p\end{array}\right\}\bar{\lambda}_H \simeq K^*\bar{\lambda}_H^p,$$

where $\bar{\lambda}_1^p$, $\bar{\lambda}_2^p$, $\bar{\lambda}_3^p$, $\bar{\lambda}_4^p$, $V_1^p$, $V_2^p$ and $\bar{\lambda}_H^p$ are line and point coordinate vectors on the image plane in pixel (directly computed from the pixel coordinates $\bar{p}_1$, $\bar{p}_2$, $\bar{p}_3$ and $\bar{p}_4$):

$$\left.\begin{array}{l}\bar{\lambda}_1^p \simeq \bar{p}_1 \times \bar{p}_2 \\ \bar{\lambda}_2^p \simeq \bar{p}_3 \times \bar{p}_4 \\ \bar{\lambda}_3^p \simeq \bar{p}_2 \times \bar{p}_3 \\ \bar{\lambda}_4^p \simeq \bar{p}_4 \times \bar{p}_1\end{array}\right\}\begin{array}{l}V_1^p \simeq \bar{\lambda}_1^p \times \bar{\lambda}_2^p \\ \\ V_2^p \simeq \bar{\lambda}_3^p \times \bar{\lambda}_4^p\end{array}\right\}\bar{\lambda}_H^p \simeq V_1^p \times V_2^p$$

The step of inferring the vanishing points $V_1$ and $V_2$ from the pairs of lines $\{\bar{\lambda}_1, \bar{\lambda}_2\}$ and $\{\bar{\lambda}_3, \bar{\lambda}_4\}$ made use of the fact that ABCD is a parallelogram (proposition 5). Using proposition 6 (in section 2.2.2), one naturally enforce orthogonality of the pattern by stating that the two vanishing points $V_1$ and $V_2$ are mutually orthogonal (see FIG. 2.11):

$$V_1 \perp V_2 \Leftrightarrow (KV_1^p) \perp (KV_2^p) \Leftrightarrow (V_1^p)^T(K^TK)(V_2^p) = 0 \quad (3.10)$$

That provides one scalar constraint in the focal lengths $f_x$ and $f_y$:

$$\frac{a_1 a_2}{f_x^2} + \frac{b_1 b_2}{f_y^2} + c_1 c_2 = 0 \qquad (3.11)$$

where $a_1$, $a_2$, $b_1$, $b_2$, $c_1$ and $c_3$ are the known pixel coordinates of the vanishing points $V_1^P$ and $V_2^P$: $V_1^P \simeq [a_1 \; b_1 \; c_1]^T$ and $V_2^P \simeq [a_2 \; b_2 \; c_2]^T$. Notice that equation 3.11 constraints the two square focals ($f_x^2, f_y^2$) to lie on a fixed hyperbola. Finally, the parallelogram ABCD is not only a rectangle, but also a square. This means that its diagonals (AC) and (BD) are also orthogonal (see FIG. 15). This constraint is exploited by enforcing the two vanishing points attached to the diagonal $V_3$ and $V_4$ to be mutually orthogonal (proposition 6). Those points are extracted from intersecting the two diagonal lines $\overline{\lambda}_5$ and $\overline{\lambda}_6$ with the horizon line $\overline{\lambda}_H$ (see FIG. 15). Following the same process of factoring the K matrix (or K*) out of every successive vector product, one obtains:

$$\overline{\lambda}_5 \simeq K^* \lambda_5^P \rightarrow V_3 \simeq K V_3^P$$

$$\overline{\lambda}_6 \simeq K^* \lambda_6^P \rightarrow V_4 \simeq K V_4^P$$

where $V_3^P$ and $V_4^P$ are the two pixel coordinates of the vanishing points $V_3$ and $V_4$ (pre-computed from the pixel coordinates of the corner points):

$$\overline{\lambda}_5^P \simeq \overline{p}_1 \times \overline{p}_3 \rightarrow V_3^P \simeq \overline{\lambda}_5^P \times \overline{\lambda}_H^P$$

$$\overline{\lambda}_6^P \simeq \overline{p}_2 \times \overline{p}_4 \rightarrow V_4^P \simeq \overline{\lambda}_6^P \times \overline{\lambda}_H^P$$

Then, the orthogonality of $V_3$ and $V_4$ yields $(V_3^P)^T (K^T K) (V_4^P) = 0$, or:

$$\frac{a_3 a_4}{f_x^2} + \frac{b_3 b_4}{f_y^2} + c_3 c_4 = 0 \qquad (3.12)$$

where $a_3$, $a_4$, $b_3$, $b_4$, $C_3$ and $c_4$ are the known pixel coordinates of $V_3^P$ and $V_4^P$: $V_3^P \simeq [a_3 \; b_3 \; c_3]^T$ and $V_4^P \simeq [a_4 \; b_4 \; c_4]^T$. This constitutes a second constraint on $f_x$ and $f_y$ (a second hyperbola in the ($f_x^2$, $f_y^2$) plane), which can be written together with equation 3.11 in a form of a linear equation in $\overline{u} = [u_1 \; u_2]^T = [1/f_x^2 \; 1/f_y^2]^T$:

$$\mathcal{A}\overline{u} = \overline{b} \text{ with } \mathcal{A} = \begin{bmatrix} a_1 a_2 & b_1 b_2 \\ a_3 a_4 & b_3 b_4 \end{bmatrix} \text{ and } \overline{b} = -\begin{bmatrix} c_1 c_2 \\ c_3 c_4 \end{bmatrix}$$

If $\mathcal{A}$ is invertible, then both focals $f_x$ and $f_y$ may be recovered explicitly:

$$\overline{u} = \begin{bmatrix} 1/f_x^2 \\ 1/f_y^2 \end{bmatrix} = \mathcal{A}^{-1} \overline{b} \Rightarrow \begin{cases} f_x = \sqrt{1/u_1} \\ f_y = \sqrt{1/u_2} \end{cases}$$

or:

$$f_x = \sqrt{\frac{a_1 a_2 b_3 b_4 - a_3 a_4 b_1 b_2}{b_1 b_2 c_3 c_4 - b_3 b_4 c_1 c_2}}$$

$$f_y = \sqrt{\frac{a_1 a_2 b_3 b_4 - a_3 a_4 b_1 b_2}{a_3 a_4 c_1 c_2 - a_1 a_2 c_3 c_4}}$$

under the condition $u_1 > 0$ and $u_2 > 0$.

If $\mathcal{A}$ is not invertible (or $a_1 a_2 b_3 b_4 - a_3 a_4 b_1 b_2 = 0$), then both focals ($f_x$, $f_y$) cannot be recovered. However, if $\mathcal{A}$ is of rank one (i.e. it is not the zero matrix), then a single focal length model $f_c = f_x = f_y$ may be used. The following claim gives a necessary and sufficient condition for $\mathcal{A}$ to be rank one:

Claim 2: The matrix $\mathcal{A}$ is rank one if and only if the projection $\overline{\lambda}_H$ of the horizon line is parallel to either the x or y axis on the image plane (its first or second coordinate is zero, not both), or crosses the origin on the image plane (its last coordinate is zero). Since the matrix K is diagonal, this condition also applies to the horizon line in pixel coordinates $\overline{\lambda}_H^P$.

Corollary: Since $\overline{\lambda}_H$ is proportional to the surface normal vector $\overline{n}_h$ (from proposition 2 in section 2.2.2), this degeneracy condition only depends upon the 3D orientation of the plane $\Pi_h$ with respect to the camera, and not the way the calibration grid is positioned onto it (this is intrinsic to the geometry of the setup).

In such a rank-one degenerate case, the reduced focal model is acceptable. Then both constraint equations 3.11 and 3.12 may be written as a function of a unique focal $f_c$ and follows:

$$\begin{bmatrix} c_1 c_2 \\ c_3 c_4 \end{bmatrix} f_c^2 = -\begin{bmatrix} a_1 a_2 + b_1 b_2 \\ a_3 a_4 + b_3 b_4 \end{bmatrix}$$

which may be solved in a least squares fashion, yielding the following solution:

$$f_c = f_x = f_y = \sqrt{-\frac{c_1 c_2 (a_1 a_2 + b_1 b_2) + c_3 c_4 (a_3 a_4 + b_3 b_4)}{c_1^2 c_2^2 + c_3^2 c_4^2}} \qquad (3.13)$$

Alternative estimates may be derived by directly solving for either one of the constraint equations (3.11 or 3.12) taking $f_x = f_y = f_c$. This may be more appropriate in the case where one of the four vanishing points $V_k$ is at infinity (corresponding to $c_k = 0$). It is then better to drop the associate constraint and only consider the remaining one (remark: having a vanishing point at infinity does not necessarily mean that the matrix $\mathcal{A}$ is singular). Since the vector $\overline{\lambda}_H$ is parallel to the normal vector $\overline{n}_h$ of the ground plane $\Pi_h$, this rank-one degeneracy case corresponds to having one of the camera axis $X_c$, $Y_c$ or $Z_c$ parallel to the calibration plane $\Pi_h$.

Note that if two vanishing points are at infinity, then the projection of the entire horizon line, $\overline{\lambda}_H$ is also at infinity on the image plane (its two first coordinates are zero). This occurs only when the calibration plane $\Pi_h$ is strictly parallel to the image plane (or $\overline{n}_h = [0 \; 0 \; 1]^T$), which is known to be a degenerate case where there exists no solution for calibration.

In the case where the planar pattern is a rectangle, but not necessarily a square (or equivalently, the aspect ratio of the rectangle is not known), then the diagonal constraint is not available (equation 3.12). In that case, only equation 3.11 is available to estimate focal length. It is therefore necessary to use a reduced single focal model $f_c = f_x = f_y$:

$$f_c = f_x = f_y = \sqrt{-\frac{a_1 a_2 + b_1 b_2}{c_1 c_2}} \quad (3.14)$$

This expression will be used in a calibration experiment illustrated in FIG. 3.5.

Once the camera matrix K is estimated, the normalized horizon vector $\bar{\lambda}_H \simeq K^* \bar{\lambda}_H^p$ may be recovered. From proposition 2, this vector is known to be proportional to the coordinate vector $\bar{\omega}_h$ of $\Pi_h$ (or its normal vector $\bar{n}_h$). Therefore, this directly provides the orientation in 3D space of the ground plane. The only quantity left to estimate is then its absolute distance $d_h$ to the camera center, or equivalently the norm $\|\bar{\omega}_h\| = 1/d_h$. This step may be achieved by making use of the known area of the square ABCD and applying an inverse perspective projection on it (possible since the orientation of $\Pi_h$ is known).

Implementation details: In principle, only the four extreme corners of the rectangular pattern are necessary to localize the four vanishing points $V_1^p$, $V_2^p$, $V_3^p$, and $V_4^p$. However, in order to be less sensitive to pixel noise, it is better in practice to make use of all the detected corners on the grid (points extracted using the Harris corner finder). This aspect is especially important given that vanishing point extraction is known to be very sensitive to noise in the corner point coordinates (depending on amount of depth perspective in the image). One possible approach is to fit a set of horizontal and vertical lines to the pattern points, and then recover the two vanishing points $V_1^p$, $V_2^p$ by intersecting them in a least squares fashion. Once these two points are extracted, the position of the extreme corners of the rectangular pattern may be corrected by enforcing the four extreme edges of the grid to go through those vanishing points. The next step consists of warping the perspective view of the rectangle into a perspective view of a square (making use of the known aspect ration of the original rectangle). The two remaining vanishing points $V_3^p$ and $V_4^p$ may then be localized by intersecting the two diagonals of this square with the horizon line $\bar{\lambda}_H^p$ connecting $V_1^p$ and $V_2^p$. Once those four points are extracted, the focal length may be estimated, together with the plane coordinate vector $\bar{\omega}_h$ following the method described earlier (using a one or two focal model).

When Using a 3D Calibration Rig

Figure 16:
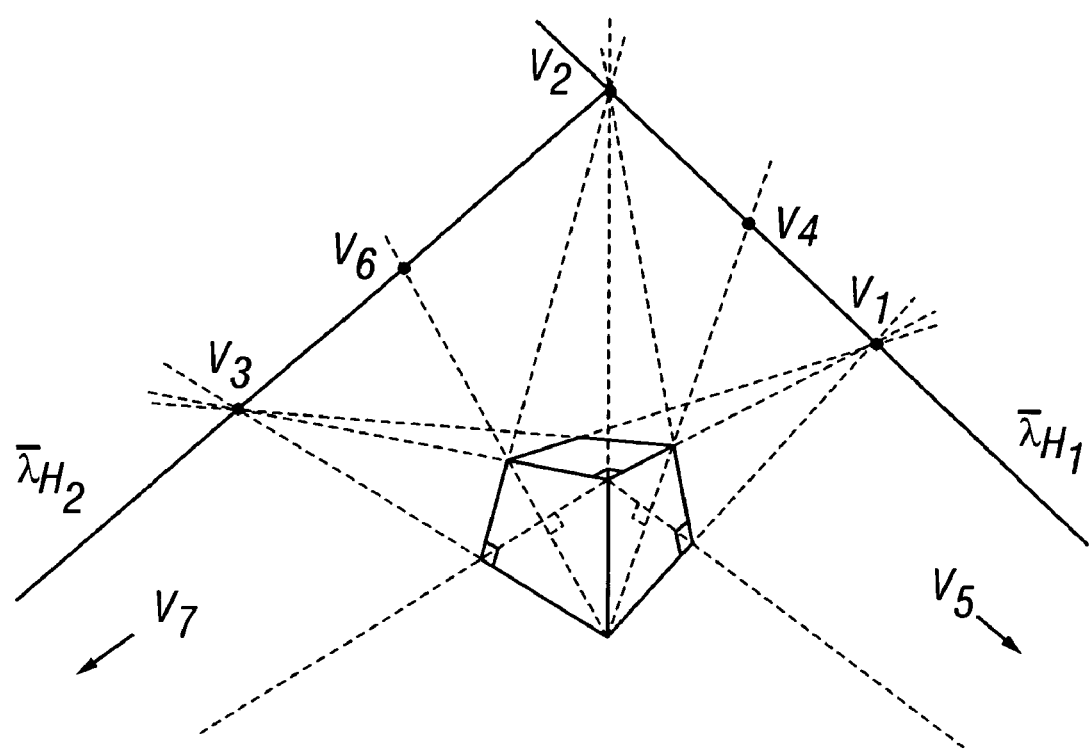
FIG. 16 shows a perspective view of a 3D cube.

Let us generalize the results to the case where a 3D rig of the type in FIG. 5 is used for calibration. FIG. 16 shows a perspective view of a cube in 3D. From that image, one may extract seven vanishing points $V_1, V_2, \ldots V_7$. Similarly to the case of a planar square, this set of points must satisfy five orthogonality properties: $V_1 \perp V_2$, $V_1 \perp V_3$, $V_2 \perp V_3$, $V_4 \perp V_5$ and $V_6 \perp V_7$. Then, similarly to equation 3.10, we can write a set of five scalar constraints on the pixel coordinates of the vanishing points:

$$\begin{cases} V_1 \perp V_2 \Rightarrow (V_1^p)^T (K^T K)(V_2^p) = 0 \\ V_1 \perp V_3 \Rightarrow (V_1^p)^T (K^T K)(V_3^p) = 0 \\ V_2 \perp V_3 \Rightarrow (V_2^p)^T (K^T K)(V_3^p) = 0 \\ V_4 \perp V_5 \Rightarrow (V_4^p)^T (K^T K)(V_5^p) = 0 \\ V_6 \perp V_7 \Rightarrow (V_6^p)^T (K^T K)(V_7^p) = 0 \end{cases} \quad (3.15)$$

Where K is the intrinsic camera matrix and $V_i^p \simeq [a_i \; b_i \; c_i]^T$ (i=1, ..., 7) are the pixel coordinate vectors of the vanishing points (see FIG. 16). Note that the first three constraints in (3.15) enforce mutual orthogonality of the faces of the cube, whereas the last two force the left and right faces (and therefore all the others) to be squares.

Given those five independent constraints, one should be able to estimate a full 5 degrees of freedom (DOF) camera model for metric calibration including two focal lengths ($f_x$ and $f_y$ in pixels), the optical center coordinates ($c_x$ and $c_y$ in pixels) and the skew factor $\alpha$ (see equation 3.2). In that case, the intrinsic camera matrix K takes its most general form [31]:

$$K = \begin{bmatrix} 1/f_x & \alpha/f_x & -c_x/f_x \\ 0 & 1/f_y & -c_y/f_y \\ 0 & 0 & 1 \end{bmatrix}$$

This model matches precisely the notation introduced in equation (3.2). Then, the semi-positive definite matrix $K^T K$ may be written as follows:

$$K^T K = \frac{1}{f_x^2} \begin{bmatrix} 1 & \alpha & -c_x \\ \alpha & \alpha^2 + (f_x/f_y)^2 & -\alpha c_x - c_y (f_x/f_y)^2 \\ -c_x & -\alpha c_x - c_y (f_x/f_y)^2 & f_x^2 + c_x^2 + c_y^2 (f_x/f_y)^2 \end{bmatrix} \quad (3.16)$$

$$= \frac{1}{f_x^2} \begin{bmatrix} 1 & u_5 & -u_3 \\ u_5 & u_2 & -u_4 \\ -u_3 & -u_4 & u_1 \end{bmatrix} \quad (3.17)$$

Notice that the vanishing point constraints (3.15) are homogeneous. Therefore, one can substitute $K^T K$ by its proportional matrix $f_x^2 K^T K$. Doing so, the five constraints listed in equation 3.15 are linear in the vector $\bar{u} = [u_1 \ldots u_5]^T$. Indeed, for $(i, j) \in \{(1,2), (1,3), (2,3), (4,5), (6,7)\}$, we have:

$$[-c_i c_j, -b_i b_j \; (a_i c_j + a_j c_i) \; (b_i c_j + b_j c_i) \; -(a_i b_j + a_j b_i)]\bar{u} = a_i a_j, \quad (3.18)$$

Therefore, this set of 5 equations may be written in a form of a linear system of 5 equations in variable $\bar{u}$:

$$\mathcal{A}\bar{u} = \bar{b} \quad (3.19)$$

where $\mathcal{A}$ is a 5×5 matrix, and $\bar{b}$ a 5-vector:

$$\mathcal{A} = \begin{bmatrix} -c_1 c_2 & b_1 b_2 & (a_1 c_2 + a_2 c_1) & (b_1 c_2 + b_2 c_1) & -(a_1 b_2 + a_2 b_1) \\ -c_1 c_3 & b_1 b_3 & (a_1 c_3 + a_3 c_1) & (b_1 c_3 + b_3 c_1) & -(a_1 b_3 + a_3 b_1) \\ -c_2 c_3 & b_2 b_3 & (a_2 c_3 + a_3 c_2) & (b_2 c_3 + b_3 c_2) & -(a_2 b_3 + a_3 b_2) \\ -c_4 c_5 & b_4 b_5 & (a_4 c_5 + a_5 c_4) & (b_4 c_5 + b_5 c_4) & -(a_4 b_5 + a_5 b_4) \\ -c_6 c_7 & b_6 b_7 & (a_6 c_7 + a_7 c_6) & (b_6 c_7 + b_7 c_6) & -(a_6 b_7 + a_7 b_6) \end{bmatrix},$$

-continued $$\bar{b} = \begin{bmatrix} a_1 a_2 \\ a_1 a_3 \\ a_2 a_3 \\ a_4 a_5 \\ a_6 a_7 \end{bmatrix}$$

If the matrix $\mathcal{A}$ is invertible, this system admits a solution $\bar{u}=\mathcal{A}^{-1}\bar{b}$. Finally, the intrinsic camera parameters are retrieved from $\bar{u}$ as follows:

$$\begin{cases} f_x = \sqrt{u_1 - u_3^2 - \dfrac{(u_4 - u_3 u_5)^2}{u_2 - u_5^2}} \\ f_y = f_x \Big/ \sqrt{u_2 - u_5^2} \\ c_x = u_3 \\ c_y = \dfrac{u_4 - u_3 u_5}{u_2 - u_5^2} \\ \alpha = u_5 \end{cases} \quad (3.20)$$

This final step consisting of de-embedding the intrinsic parameters from the vector $\bar{u}$ is equivalent to a Choleski decomposition of the matrix $K^T K$ in order to retrieve K.

If $\mathcal{A}$ is not invertible, then the camera model needs to be reduced. A similar situation occurs when only one face of the rectangular parallelepiped is known to be square. In that case, one of the last two constraints of (3.15) has to be dropped, leaving only 4 equations. A first model reduction consists of setting the skew factor $\alpha=0$, and keeping as unknowns the two focals ($f_x$, $f_y$) and camera center ($c_x$, $c_y$). That approximation is very reasonable for most cameras currently available. The resulting camera matrix K has the form:

$$K = \begin{bmatrix} 1/f_x & 0 & -c_x/f_x \\ 0 & 1/f_y & -c_y/f_y \\ 0 & 0 & 1 \end{bmatrix} \quad (3.21)$$

leading to the following $K^T K$ matrix:

$$K^T K = \frac{1}{f_x^2}\begin{bmatrix} 1 & 0 & -c_x \\ 0 & (f_x/f_y)^2 & -c_y(f_x/f_y)^2 \\ -c_x & -c_y(f_x/f_y)^2 & f_x^2 + c_x^2 + c_y^2(f_x/f_y)^2 \end{bmatrix}$$

$$= \frac{1}{f_x^2}\begin{bmatrix} 1 & 0 & -u_3 \\ 0 & u_2 & -u_4 \\ -u_3 & -u_4 & u_1 \end{bmatrix}$$

Then, each constraint $(V_i^p)^T (K^T K)(V_j^p)=0$ may be written in the form of a linear equation in $\bar{u}=[u_1 \ldots u_4]^T$:

$$[-c_i c_j - b_i b_j \ (a_i c_j + a_j c_i) \ (b_i c_j + b_j c_i)]\bar{u} = a_i a_j, \quad (3.22)$$

resulting in a 4×4 linear system $\mathcal{A}\bar{u}=\bar{b}$, admitting the solution $\bar{u}$ if $\mathcal{A}$ is rank 4. The intrinsic camera parameters ($f_x$, $f_y$, $c_x$, $c_y$) may then be computed from the vector $\bar{u}$ following the set of equations (3.20) setting $\alpha=u_5=0$. When $\mathcal{A}$ has rank less than 4, the camera model needs to be further reduced (that is the case when only 3 orthogonality constraints are available). A second reduction consists of using a single focal $f_c=f_x=f_y$, leading to a 3 DOF model. In that case, the K matrix takes on the following reduced expression:

$$K = \begin{bmatrix} 1/f_c & 0 & -c_x/f_c \\ 0 & 1/f_c & -c_y/f_c \\ 0 & 0 & 1 \end{bmatrix} \Rightarrow$$

$$K^T K = \frac{1}{f_c^2}\begin{bmatrix} 1 & 0 & -c_x \\ 0 & 1 & -c_y \\ -c_x & -c_y & (f_c^2 + c_x^2 + c_y^2) \end{bmatrix} = \frac{1}{f_c^2}\begin{bmatrix} 1 & 0 & -u_2 \\ 0 & 1 & -u_3 \\ -u_2 & -u_3 & u_1 \end{bmatrix}$$

Then, each constraint listed in (3.15) can be written in the form of a linear equation of the variable $\bar{u}=[u_1 \ u_2 \ u_3]^T$:

$$(V_i^p)^T (K^T K)(V_j^p) = 0 \Leftrightarrow [-c_i c_j \ (a_i c_j + a_j c_i) \ (b_i c_j + b_j c_i)]$$
$$\bar{u} = (a_i a_j + b_i b_j)$$

Once again, this leads to the linear problem $\mathcal{A}\bar{u}=\bar{b}$ where $\mathcal{A}$ is a 5×3 matrix, and $\bar{b}$ a 5-vector (if all five constraints are valid). A least squares solution is in general possible: $\bar{u}=(\mathcal{A}^T \mathcal{A})^{-1} \mathcal{A}^T \bar{b}$. Notice that if the faces of the rig are known mutually orthogonal but not necessarily square, then only the three first constraints of (3.15) are enforceable. In that case, the linear system is 3×3, and its solution is $\bar{u}=\mathcal{A}^{-1}\bar{b}$. Once the vector $\bar{u}$ is recovered, the intrinsic camera parameters have the following expression:

$$\begin{cases} f_c = f_x = f_y = \sqrt{u_1 - u_2^2 - u_3^2} \\ c_x = u_2 \\ c_y = u_3 \end{cases} \quad (3.23)$$

When $\mathcal{A}$ has rank less than 3, the model needs to be further reduced to 2 or 1 DOF by taking the optical center out of the model (fixing it to the center of the image) and then going back to the original model adopted in the planar rig case (one or two focal models).

This system can enable decoupling intrinsic from extrinsic parameters and derive a set of closed-form solutions for intrinsic camera calibration in case of five model orders: 1, 2, 3, 4 and 5 degrees of freedom. In addition, we stated conditions of observability of those models under different experimental situations corresponding to planar and three-dimensional rigs. The following table summarizes the results by giving, for each model order, the list of parameters we have retrieved explicit expressions for, as well as the minimum structural rig necessary to estimate the model:

| Model order | Parameters | Calibration rig (minimum required structure) |
| --- | --- | --- |
| 1 DOF | $f = f_x = f_y$ | 2D rectangle |
| 2 DOF | $f_x, f_y$ | 2D square |
| 3 DOF | $f = f_x = f_y, c_x, c_y$ | 3D rectangular parallelepiped |
| 4 DOF | $f_x, f_y, c_x, c_y$ | 3D rectangular parallelepiped with one square face |
| 5 DOF | $f_x, f_y, c_x, c_y, \alpha$ | 3D cube |

One could use this explicit set of solutions for calibrating image sequences where intrinsic camera parameters are time varying. A typical sequence could be a flyby movie over a city with buildings.

In a broader sense, this work provides a general framework for approaching problems involving reconstruction of three-dimensional scenes with known structural constraints (for example orthogonality of building walls in a picture of a city). Indeed, constraints, such as parallelism or orthogonality, find very compact and exploitable representations in dual-space. This approach may avoid traditional iterative minimization techniques (computationally expensive) in order to exploit constraints in a scene.

Although only a few embodiments have been disclosed in detail above, other embodiments are possible.

What is claimed is:

1. A method, comprising:
   moving a shadow across a three-dimensional scene;
   imaging said moving shadow by separately temporally processing the moving shadow and spatially processing the moving shadow, the temporal processing determining temporal information about the moving shadow and the spatial processing determining shadow information associated with information within said temporal information;
   determining three dimensional information about the scene from both the shadow information and from the temporal information; and
   wherein said determining comprises triangulating to form information indicative of points on the three-dimensional scene.

2. A method as in claim 1, wherein said imaging comprises using a camera to obtain an image of the moving shadow.

3. A method as in claim 2, further comprising determining a transformation between an image plane of the camera and actual plane comprising the three-dimensional scene.

4. A method as in claim 1, further comprising an initial operation of calibrating a position of a light source.

5. A method as in claim 4, wherein said calibrating a position of the light source comprises imaging an item of known height by defining a position of its shadow, and triangulating a position of the light source.

6. A method as in claim 1, further comprising an initial operation of calibrated a position of a plane on which the three-dimensional scene is located.

7. A method as in claim 1, further comprising converting said projection into actual shadow information.

8. A method as in claim 1, wherein said determining comprises obtaining images of different edges at different locations, and using information about the intersection to form three-dimensional information.

9. A method as in claim 1, further comprising thresholding the temporal processing and the spatial processing to make both refer to the same points.

10. A method, comprising:
    moving a shadow across a three-dimensional scene;
    imaging said moving shadow by separately temporally processing the moving shadow and spatially processing the moving shadow, the temporal processing determining temporal information about the moving shadow and the spatial processing determining shadow information associated with information within said temporal information;
    determining three dimensional information about the scene from both the shadow information and from the temporal information; and
    wherein said determining comprises converting information into a dual-space representation, and calculating said information in said dual space representation.

11. A method comprising:
    obtaining an image of a moving shadow on a three-dimensional scene using an image acquisition element;
    determining a profile of different intensity portions of said moving shadow and using said profile to define an edge of said moving shadow; and
    converting said image using additional information, to determine actual three dimensional information about the three-dimensional scene.

12. A method as in claim 11, wherein said additional information is a position of a light source.

13. A method as in claim 12, further comprising obtaining an object of known height, obtaining as shadow of said object, and using said shadow to determine the position of the light source.

14. A method as in claim 11, wherein said additional information is a position of a reference plane.

15. A method as in claim 14, wherein said reference plane is a single reference plane.

16. A method as in claim 14, wherein said additional information about said reference plane includes a position of two different reference planes.

17. A method as in claim 14, further comprising a calibration operation that determines a position of the reference plane.

18. A method as in claim 11, wherein said additional information is information about a shadow of unknown object of known height.

19. A method as in claim 11, wherein said additional information is information from a second light source.

20. A method as in claim 11, wherein said additional information is information from a second shadow.

21. A method as in claim 11, wherein said converting comprises converting a projection of the shadow into actual shadow information.

22. A method as in claim 11, wherein said additional information is information which propagates between edges of the image.

23. A method as in claim 11, wherein said shadow is formed by two separate light sources.

24. A method as in claim 11, wherein said converting comprises defining said shadow as a set of edges $\epsilon$, and a set of intersection points pk.

25. A method as in claim 11, wherein said determining the profile comprises determining both spatial information and temporal information of the profile, and said determining an edge of the shadow uses both said spatial and temporal information.

26. A method as in claim 11, wherein said converting comprises calculating values in dual space.

27. A method as in claim 11, wherein said converting comprises determining both temporal information about the moving shadow anti shadow information about the moving shadow at times based on information within said temporal information, and determining said three-dimensional information based on both the shadow information and the temporal information by determining shadow information at each of a plurality of times.

28. A method of imaging a three-dimensional surface, comprising:
    projecting a moving shadow across the three-dimensional surface to be imaged;

extracting temporal information from said moving shadow and using said temporal information in a temporal coordinate system to determine a plurality of times;

obtaining an image of the moving shadow in a spatial coordinate system at each of the plurality of times;

wherein each image includes a line of the shadow, including a plurality of points p, which represent points P on the three-dimensional surface;

determining a relationship between the image and the three-dimensional surface at each of the plurality of times; and converting said image into information indicative of the three-dimensional surface.

29. A method as in claim 28, wherein said converting comprises triangulating between a reference plane of an imaging object and a reference plane of the three-dimensional surface.

30. A method as in claim 29, wherein said triangulating includes determining a position of a light source, and determining a reference plane between said light source and a line of the moving shadow.

31. A method as in claim 30, wherein said determining a position of a light source comprises using an object of known height to triangulate a position of a light source, by obtaining a shadow of the object of known height.

32. A method as in claim 29, wherein said converting comprises determining positions of horizontal and vertical reference planes, and triangulating using said positions.

33. A method as in claim 32, wherein said determining positions comprises determining positions of at least one plane by a calibration operation.

34. A method as in claim 28, wherein said obtaining comprises using a camera to obtain said image, and wherein said converting comprises determining information about the camera reference plane, and converting said image using said information about the camera reference plane.

35. A method as in claim 28, further comprising equalizing information from the temporal coordinate system and the spatial coordinates system using thresholds.

36. A method of imaging a three-dimensional surface, comprising:
projecting a moving shadow across the three-dimensional surface to be imaged;
extracting temporal information from said moving shadow and using said temporal information in a temporal coordinate system to determine a plurality of times;
obtaining an image of the moving shadow in a spatial coordinate system at each of the plurality of times;
determining a relationship between the image and the three-dimensional surface at each of the plurality of times;
converting said image into information indicative of the three-dimensional surface; and
wherein said converting comprises converting the information obtained into dual space, and calculating the values obtained in the dual space representation.

37. A method of imaging a three-dimensional surface, comprising:
projecting a moving shadow across the three-dimensional surface to be imaged;
extracting temporal information from said moving shadow and using said temporal information in a temporal coordinate system to determine a plurality of times;
obtaining an image of the moving shadow in a spatial coordinate system at each of the plurality of times;
determining a relationship between the image and the three-dimensional surface at each of the plurality of times;
converting said image into information indicative of the three-dimensional surface; and
wherein said converting comprises determining three-dimensional information about three points in the image, and determining all other points from said determining three points.

38. An apparatus comprising:
a camera, obtaining an image of a scene, and producing a signal indicative thereof; and
a processor, processing said image to determine a moving shadow in the image, and to determine three-dimensional information about the scene represented by the image, by determining temporal information about the moving shadow in a temporal coordinate system and determining shadow information in a spatial coordinate system and equalizing the temporal information and the shadow information to refer to the same points.

39. An apparatus as in claim 38, further comprising a memory, associated with said processor, storing information obtained from camera calibration.

40. An apparatus as in claim 39, wherein said information stored in said memory comprises ground plane information.

41. An apparatus as in claim 39, wherein said memory also stores information indicative of a length of a device used to produce said moving shadow.

42. An apparatus as in claim 39, wherein said memory also stores information about a profile of brightness intensity.

43. An apparatus as in claim 39, wherein said memory also stores information about a threshold of brightness intensity.

44. An apparatus as in claim 43, wherein said processor processes only pixels of the image which have intensity values greater than said specified threshold.

45. An apparatus as in claim 39, wherein said memory stores information about a location of a light source.

46. An apparatus as in claim 39, wherein said processor uses said information in the memory to transform between an image plane of said camera and an actual plane comprising the three-dimensional scene.

47. An apparatus as in claim 38, wherein said processor also operates to determine a profile of the shadow as it moves, and to determine an edge of the shadow by using information from said profile.

48. An apparatus as in claim 47, wherein said processor determines both spatial and temporal information about the profile and determines the edge of the shadow using both said spatial and temporal information.

49. An apparatus comprising:
a camera, obtaining an image of a scene, and producing a signal indicative thereof; and
a processor, processing said image to determine a moving shadow in the image, and to determine three-dimensional information about the scene represented by the image, by determining temporal information about the moving shadow in a temporal coordinate system and determining shadow information in a spatial coordinate system and equalizing the temporal information and the shadow information to refer to the same points; and
wherein said processor carries out an operation to determine information in two orthogonal shadow planes, and determining a position of a light source automatically from said information in said two orthogonal shadow planes.

50. An apparatus comprising:
a camera, obtaining an image of a scene, and producing a signal indicative thereof; and
a processor, processing said image to determine a moving shadow in the image, and to determine three-dimensional information about the scene represented by the image, by determining temporal information about the moving shadow in a temporal coordinate system and determining shadow information in a spatial coordinate system and equalizing the temporal information and the shadow information to refer to the same points;
further comprising a memory, associated with said processor, storing information obtained from camera calibration; and
wherein said memory does not store information about a location of the light source, and wherein said processor carries out an operation to determine information about shadows in two orthogonal shadow planes.

51. A computer-readable storage medium, including instructions in machine readable form, which are executed by a general purpose machine, the set of instructions comprising instructions to:
detect a movement of the shadow in a sequence of two-dimensional images, across the three-dimensional scene; and
use calibration information to determine information about the actual plane of the three-dimensional scene based on the transformation between the image plane of the device acquiring the two-dimensional image, and the three-dimensional scene, wherein said instructions include instructions to determine information in two orthogonal shadow planes, and to determine a position of a light source automatically from said information in said two orthogonal shadow planes.

52. A medium as in claim 51, wherein said instructions include instructions to automatically determine a position of the light source from the information in said image.

53. A medium as in claim 51, wherein said calibration information includes information indicative of a position of a ground plane.

54. A medium as in claim 51, wherein said calibration information includes information indicative of a length of a device being used to produce said moving shadow.

55. A medium as in claim 51, further comprising instructions to determine a threshold of intensity values and accept parts of said image when they are greater than said threshold.

56. A medium as in claim 51, wherein said instructions further comprising instructions to determine a profile of the shadow image as it moves, including at least intensity information about the moving shadow, and using information in the profile to determine an edge of said shadow.

57. A medium as in claim 56, wherein said profile also includes temporal information, and both said intensity information and said temporal information are used to determine said edge of said shadow.

58. A method, comprising:
moving a shadow across a three-dimensional scene;
imaging said moving shadow by determining temporal information about the moving shadow arid determining shadow information associated with times within said temporal information; and
determining three dimensional information about the scene from the shadow information and from the temporal information, wherein said imaging further comprises determining a profile of the shadow image as it moves, that includes at least intensity information about different parts of the moving shadow image, and determining an edge of the shadow image by determining a profile of said shadow and using said profile to determine an edge of said shadow.

59. A method as in claim 58, wherein said determining the profile comprises determining both spatial information and time information of the profile, and said determining an edge of the shadow uses both said spatial and temporal information.

60. A method, comprising:
moving a shadow across a three-dimensional scene;
imaging said moving shadow by determining temporal information about the moving shadow and determining shadow information associated with times within said temporal information; and
determining three dimensional information about the scene from the shadow information and from the temporal information, wherein said determining the profile comprises determining mean values between shadow parts of the image and non-shadow parts of the image, and using said mean values to determine zero crossing points.

61. A method, comprising:
moving a shadow across a three-dimensional scene;
imaging said moving shadow by separately temporally processing the moving shadow and spatially processing the moving shadow, the temporal processing determining temporal information about the moving shadow and the spatial processing determining shadow information associated with information within said temporal information;
determining three dimensional information about the scene from both the shadow information and from the temporal information; and
wherein said determining comprises calculating values in dual space.

62. A method comprising:
obtaining an image of a moving shadow on a three-dimensional scene using an image acquisition element;
determining a profile of different intensity portions of said moving shadow and using said profile to define an edge of said moving shadow; and
converting said image using additional information, to determine actual three dimensional information about the three-dimensional scene, wherein said determining the profile comprises determining both spatial information and temporal information of the profile, and said determining an edge of the shadow uses both said spatial and temporal information,wherein said determining the profile comprises determining mean values between shadow parts of the image and non-shadow parts of the image, and using said mean values to determine zero crossing points.

* * * * *